(12) United States Patent
Shoji et al.

(10) Patent No.: US 8,175,467 B2
(45) Date of Patent: May 8, 2012

(54) APPARATUS, METHOD, AND SYSTEM FOR DETECTING A STATE OF AN APPARATUS

(75) Inventors: Hisashi Shoji, Kanagawa (JP); Masaichi Sawada, Tokyo (JP); Osamu Satoh, Kanagawa (JP); Yasushi Nakazato, Tokyo (JP); Seiji Hoshino, Kanagawa (JP); Hitoshi Shimizu, Kanagawa (JP); Takenori Oku, Saitama (JP); Noboru Tsukude, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 845 days.

(21) Appl. No.: 11/452,411

(22) Filed: Jun. 14, 2006

(65) Prior Publication Data

US 2006/0294252 A1 Dec. 28, 2006

(30) Foreign Application Priority Data

Jun. 14, 2005 (JP) ................. 2005-173460
Aug. 9, 2005 (JP) ................. 2005-230748

(51) Int. Cl.
*G03G 15/00* (2006.01)

(52) U.S. Cl. ................. 399/8; 399/9; 399/10
(58) Field of Classification Search ............ 399/8, 9, 399/10, 23, 27
See application file for complete search history.

(56) References Cited

U.S. PATENT DOCUMENTS

| | | |
|---|---|---|
| 4,876,606 A | 10/1989 | Banno et al. |
| 4,924,320 A | 5/1990 | Tanaka et al. |
| 5,508,520 A | 4/1996 | Shoji et al. |
| 5,606,408 A | 2/1997 | Yano et al. |
| 5,619,316 A | 4/1997 | Shoji et al. |
| 5,740,494 A | 4/1998 | Shoji et al. |
| 5,765,087 A | 6/1998 | Yano et al. |
| 5,835,816 A * | 11/1998 | Sawada et al. ............ 399/8 |
| 6,345,170 B1 | 2/2002 | Nakazato et al. |
| 6,470,169 B2 | 10/2002 | Nakazato |
| 6,519,552 B1 | 2/2003 | Sampath et al. |
| 6,577,823 B2 | 6/2003 | Matsuguma et al. |
| 6,704,524 B2 | 3/2004 | Matsuguma et al. |
| 6,798,996 B2 | 9/2004 | Sawada et al. |
| 6,799,012 B2 | 9/2004 | Shakuto et al. |

(Continued)

FOREIGN PATENT DOCUMENTS

JP 05-100517 4/1993

(Continued)

OTHER PUBLICATIONS

Non-Patent Document, Genichi Taguchi, "Technical Developments in the MT System", published on Jun. 20, 2002 w/partial English Translation.

(Continued)

*Primary Examiner* — David Gray
*Assistant Examiner* — Laura Roth
(74) *Attorney, Agent, or Firm* — Oblon, Spivak, McClelland, Maier & Neustadt, L.L.P.

(57) ABSTRACT

An apparatus, method, system, computer program, and product, each capable of detecting a state of an apparatus. The apparatus includes a plurality of devices. When at least one of the plurality of devices is determined to be in a first state, a second state of at least one of the plurality of devices is determined. When a state of the apparatus is determined to be in the first state, the second state of another apparatus is determined.

12 Claims, 23 Drawing Sheets

U.S. PATENT DOCUMENTS

| | | |
|---|---|---|
| 6,961,527 B2 | 11/2005 | Matsuguma et al. |
| 6,987,944 B2 | 1/2006 | Shakuto et al. |
| 2002/0034394 A1 | 3/2002 | Matsuguma et al. |
| 2002/0059075 A1* | 5/2002 | Schick et al. |
| 2003/0026621 A1 | 2/2003 | Matsuguma et al. |
| 2003/0081958 A1 | 5/2003 | Matsuguma et al. |
| 2004/0076441 A1 | 4/2004 | Matsuguma et al. |
| 2004/0213600 A1 | 10/2004 | Watanabe et al. |
| 2004/0260803 A1* | 12/2004 | Nakamura |
| 2005/0002054 A1 | 1/2005 | Shoji et al. |
| 2005/0058474 A1 | 3/2005 | Watanabe et al. |
| 2005/0100374 A1 | 5/2005 | Satoh et al. |
| 2005/0154562 A1 | 7/2005 | Matsuura et al. |
| 2005/0157327 A1 | 7/2005 | Shoji et al. |
| 2005/0281596 A1 | 12/2005 | Nakagawa et al. |
| 2005/0286916 A1 | 12/2005 | Nakazato et al. |
| 2006/0013604 A1 | 1/2006 | Kadota et al. |
| 2006/0088337 A1 | 4/2006 | Nakazato et al. |

FOREIGN PATENT DOCUMENTS

| | | |
|---|---|---|
| JP | 05-281809 | 10/1993 |
| JP | 07-036323 | 2/1995 |
| JP | 07-104616 | 4/1995 |
| JP | 08-030152 | 2/1996 |
| JP | 08-137344 | 5/1996 |
| JP | 2000-089623 | 3/2000 |
| JP | 2000-270141 | 9/2000 |
| JP | 2003-241448 | 8/2003 |

OTHER PUBLICATIONS

U.S. Appl. No. 12/184,734, filed Aug. 1, 2008, Nakazato, et al.
U.S. Appl. No. 11/857,132, filed Sep. 18, 2007, Satoh, et al.
U.S. Appl. No. 11/856,348, filed Sep. 17, 2007, Nakazato, et al.

* cited by examiner

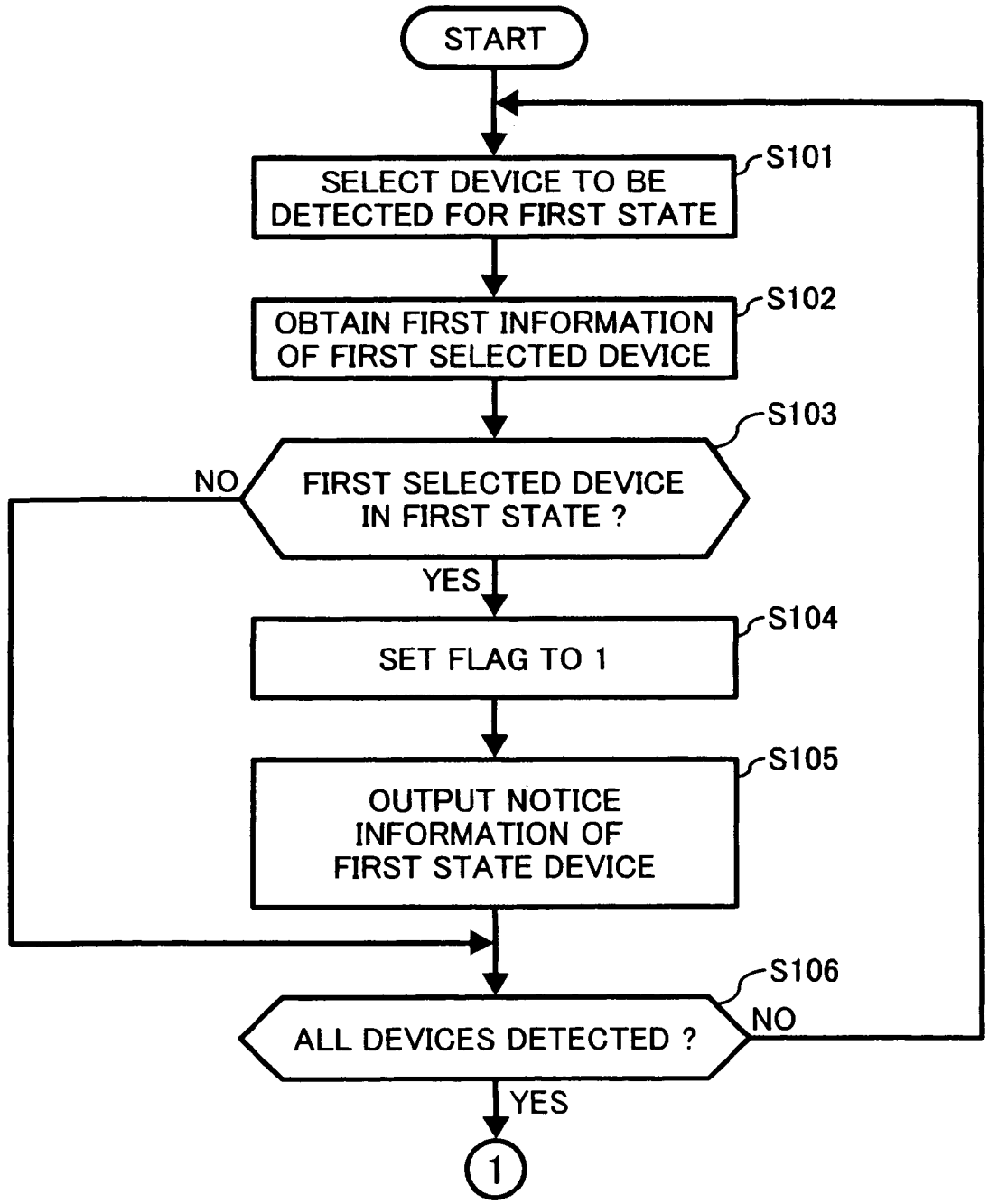

FIG. 13

| DATA TYPE | ABNORMALITY TYPE | | |
|---|---|---|---|
| | PAPER JAM | PHOTOCONDUCTOR DETERIORATION | IMAGE DENSITY FLUCTUATION |
| (1) TEMPERATURE | ○ | ○ | ○ |
| (2) HUMIDITY | ○ | ○ | ○ |
| (3) OSCILLATION | ○ | | |
| (4) TONER DENSITY (4 COLORS) | | ○ | ○ |
| (5) POTENTIAL AFTER CHARGING (4 COLORS) | | ○ | ○ |
| (6) POTENTIAL AFTER DEVELOPMENT (4 COLORS) | ○ | ○ | ○ |
| (7) COLORED AREA RATIO (4 COLORS) | ○ | | ○ |
| (8) TONER AMOUNT (4 COLORS) | ○ | | |
| (9) SHEET INCLINE | ○ | | |
| (10) SHEET FEED TIMING | ○ | | |
| (11) PHOTOCONDUCTOR CURRENT AMOUNT (4 COLORS) | | ○ | |
| (12) PHOTOCONDUCTOR DRIVE POWER (4 COLORS) | | ○ | |

FIG. 14

| MAHALANOBIS DISTANCE | | | | DEGREE OF ABNORMALITY | ABNORMALITY TYPE | NOTICE |
|---|---|---|---|---|---|---|
| $(D0)^2$ | $(D1)^2$ | $(D2)^2$ | $(D3)^2$ | | | |
| <10 | <10 | <10 | <10 | NORMAL | NONE | NONE |
| | ≥10 | NA | NA | ABNORMAL (LOW) | PAPER JAM | TRANSFER DEVICE MAINTENANCE/REPLACEMENT |
| | NA | ≥10 | NA | | PHOTOCONDUCTOR DETERIORATION | PHOTOCONDUCTOR MAINTENANCE/REPLACEMENT |
| | NA | NA | ≥10 | | IMAGE DENSITY FLUCTUATION | DEVELOPER MAINTENANCE/REPLACEMENT |
| ≥10 | <10 | <10 | <10 | ABNORMAL | OTHER TYPE | ALL DEVICES REPLACEMENT/CHECK |
| | ≥10 | NA | NA | | PAPER JAM | TRANSFER DEVICE REPLACEMENT/CHECK |
| | NA | ≥10 | NA | | PHOTOCONDUCTOR DETERIORATION | PHOTOCONDUCTOR REPLACEMENT/CHECK |
| | NA | NA | ≥10 | | IMAGE DENSITY FLUCTUATION | DEVELOPER REPLACEMENT/CHECK |

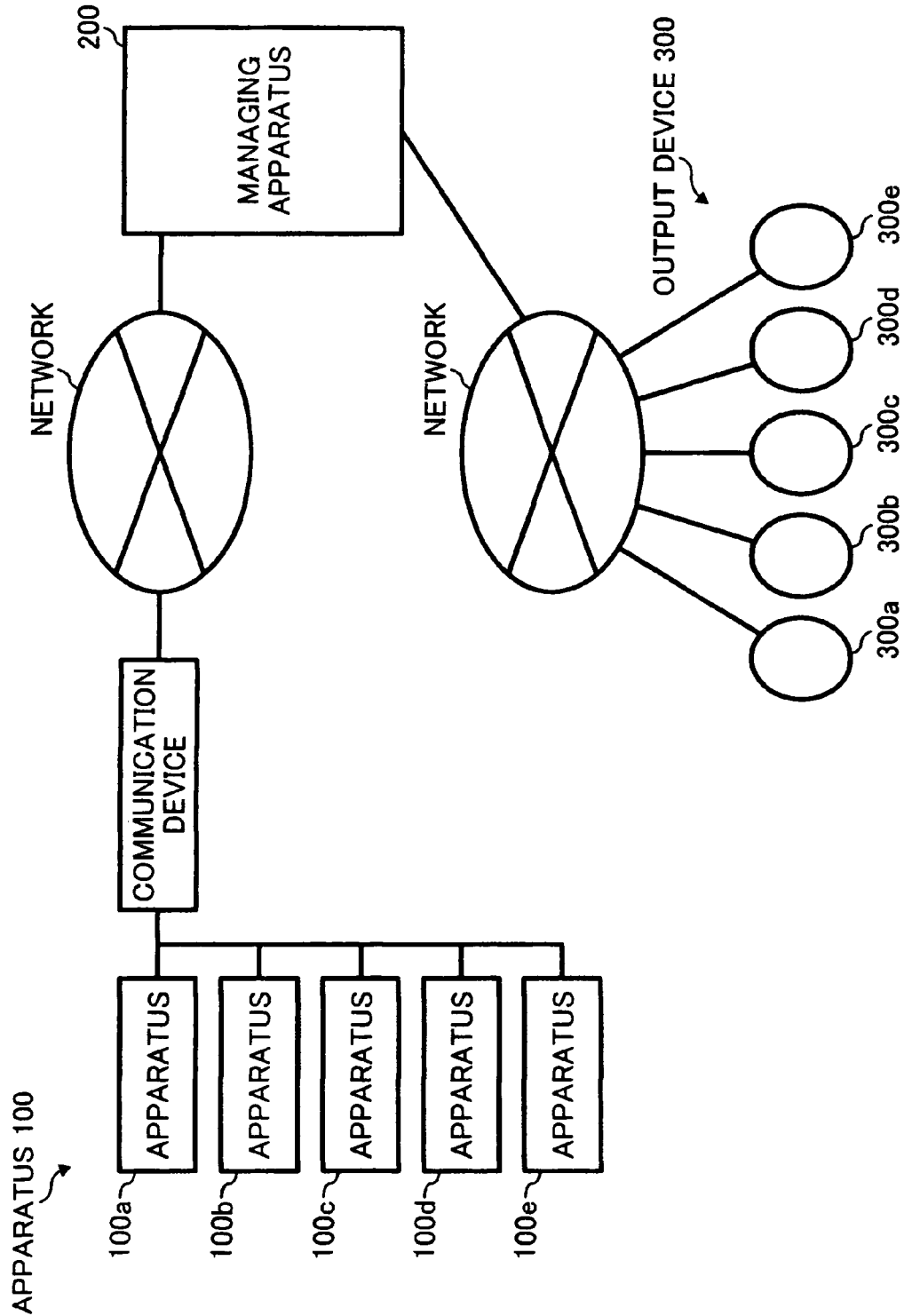

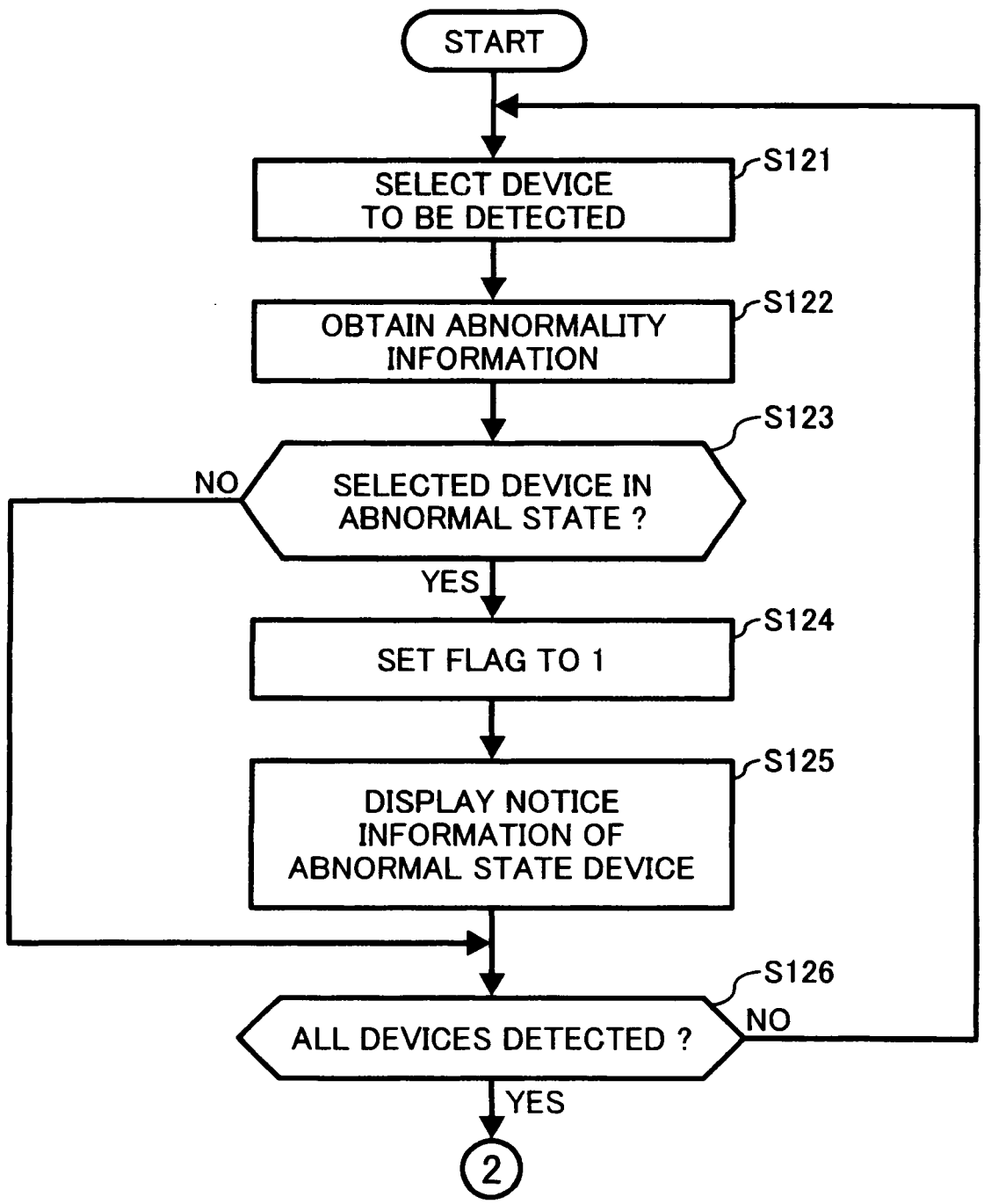

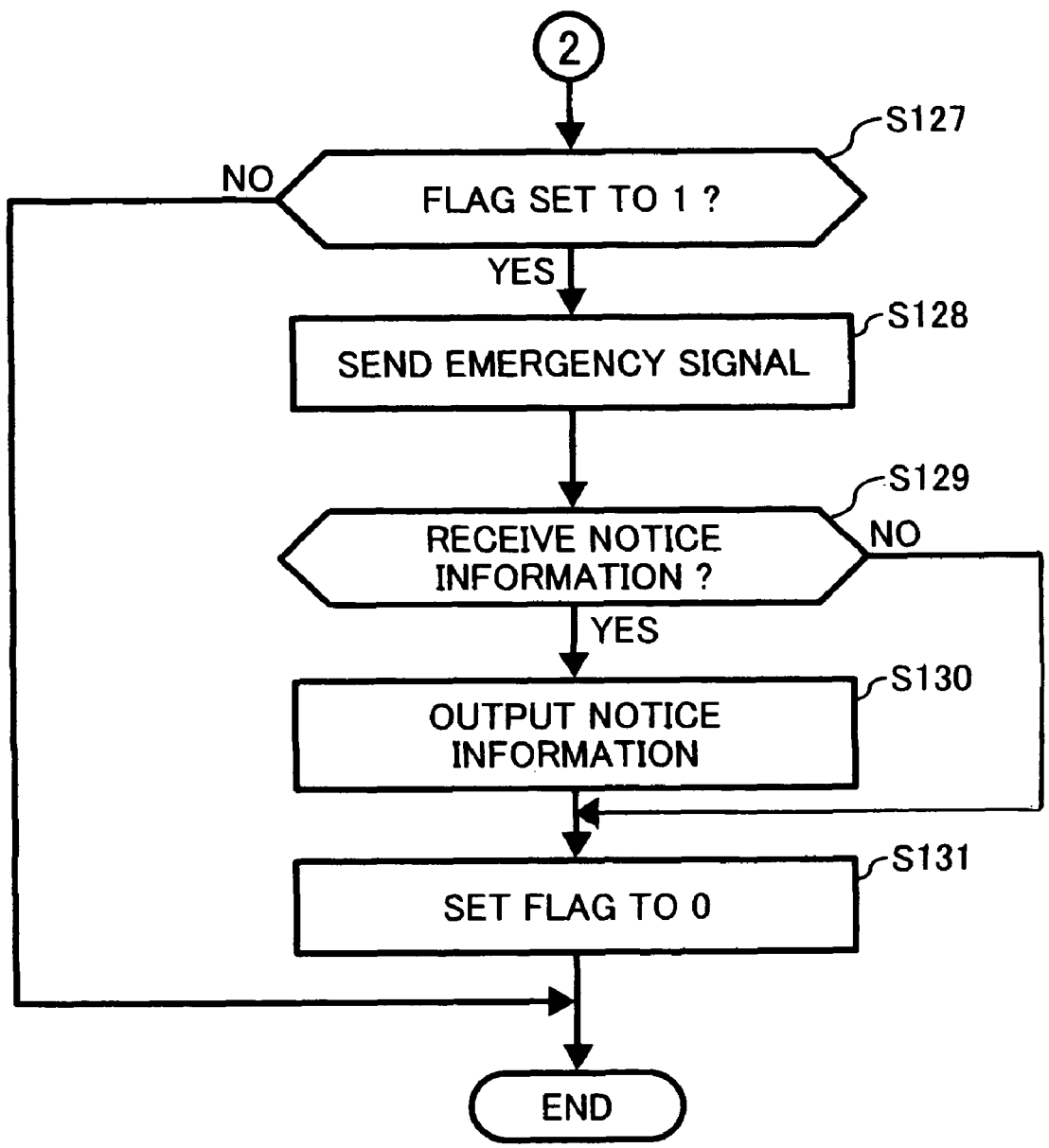

APPARATUS, METHOD, AND SYSTEM FOR DETECTING A STATE OF AN APPARATUS

BACKGROUND OF THE INVENTION

1. Field of the Invention

The following disclosure relates generally to an apparatus, method, system, computer program and product, each capable of detecting a state of an apparatus.

2. Description of the Related Art

Image forming apparatuses often need regular maintenance, inspection, or replacement of some of their devices to produce high quality images. For this reason, a provider of the apparatuses ("the service provider") sends a service person to the user's site on a regular basis to inspect an image forming apparatus. However, it has been difficult to determine an appropriate timing for sending the service person.

To help determine the appropriate timing, recent image forming apparatuses have been provided with the function of determining their current state, for example as described in any one of the JP Patent Application Publication Nos. 2003-241448, H05-281809, H05-100517, H07-36323, H07-104616, 2001-356655, 2000-270141, H08-137344, 2000-89623, and H08-30152. When the current state indicates that the apparatus needs maintenance, replacement, or inspection, the service provider sends the service person to the user's site.

However, the user may still need to call a service provider at other times, when the apparatus has an error, for example a paper jam, due to various reasons that may not be predictable. In such a case, the user may not be able to use the apparatus until the apparatus is fixed. For example, as illustrated in FIG. 1, the service person may periodically visit for maintenance, replacement, or inspection at the timing TM1. However, when the error occurs at the timing TE1, the service person may need to visit two times, since the service person may not be able to fix the apparatus without knowing the cause of the error.

In another example, as illustrated in FIG. 2, if the service provider is to send the service person based on the state of the apparatus, the overall number of visits may increase since the state of the apparatus may be changed due to a plurality of devices incorporated in the apparatus. Referring to FIG. 2, the service person visits for maintenance, replacement, or inspection of a first device at the timing TM1. The service person visits for maintenance, replacement, or inspection of a second device at the timing TM2. The service person visits for maintenance, replacement, or inspection of a third device at the timing TM3.

BRIEF SUMMARY OF THE INVENTION

Example embodiments of the present invention include an apparatus, method, system, computer program and product, each capable of detecting a state of an apparatus.

In one example, a state detecting system includes an apparatus having a plurality of devices, a first detector, and a second detector.

In one example, the first detector determines whether at least one of the plurality of devices of the apparatus is currently in a maintenance state. When the first detector determines that at least one of the plurality of devices is currently in the maintenance state, the second detector determines whether at least one of other devices, which is not determined to be in the maintenance state, may be in the maintenance state in the future.

In another example, the first detector determines whether at least one of the plurality of devices of the apparatus is currently in an abnormal state. When the first detector determines that at least one of the plurality of devices is currently in the abnormal state, the second detector determines whether at least one of the devices, which is not determined to be in the abnormal state, may be in the abnormal state in the future.

In another example, the first detector determines whether at least one of the plurality of devices of the apparatus is in a maintenance state. When the first detector determines that at least one of the plurality of devices is in the maintenance state, the second detector determines whether at least one of the devices, which is not determined to be in the maintenance state, is in an abnormal state.

In another example, the first detector determines whether at least one of the plurality of devices of the apparatus is in an abnormal state. When the first detector determines that at least one of the plurality of devices is in the abnormal state, the second detector determines whether at least one of the devices, which is not determined to be in the abnormal state, is in a maintenance state.

In another example, the first detector determines whether at least one of the plurality of devices of the apparatus is in a first state. When the first detector determines that at least one of the plurality of devices is in the first state, the second detector may identify one or more apparatuses, which are located in a region where the apparatus is located. When the one or more apparatuses are identified, the second detector may determine whether at least one of the identified apparatuses is in a second state.

In another example, a state detecting system includes a first apparatus having a plurality of devices, and a second apparatus, which may be connected through a network.

For example, the first apparatus determines whether at least one of the plurality of devices is in a first state to generate a first determination result. When the first determination result indicates that the at least one of the plurality of devices is in the first state, the second apparatus determines whether at least one of the plurality of devices of the first apparatus, which is not determined to be in the first state, is in a second state to generate a second determination result.

In another example, the first apparatus may send various kinds of information regarding the plurality of devices to the second apparatus. The second apparatus determines whether at least one of the plurality of devices of the first apparatus is in a first state, using at least one of the various kinds of information, to generate a first determination result. When the first determination result indicates that the at least one of the plurality of devices of the first apparatus is in the first state, the second apparatus determines whether at least one of the plurality of devices of the first apparatus, which is not determined to be in the first state, is in a second state.

In another example, a state detecting system includes a first apparatus, a second apparatus, and a third apparatus, which may be connected through a network. The first apparatus and third apparatus may be closely located or they may be connected through a local network.

For example, the first apparatus or the third apparatus send various kinds of information regarding the first apparatus or the third apparatus to the second apparatus. The second apparatus determines whether at least one of the first apparatus and third apparatus is in a first state to generate a first determination result. When the first determination result indicates that the at least one of the first apparatus and third apparatus is in the first state, the second apparatus determines whether at least one of the first apparatus and the third apparatus, which is not determined to be in the first state, is in a second state.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 9A and 9B illustrate an example operation of detecting a state of the image forming apparatus shown in FIG. 8;

FIG. 13 illustrates example types of information obtained from the image forming apparatus shown in FIG. 8;

FIG. 14 illustrates example comparison results, determination results, and notification information, obtained from the image forming apparatus shown in FIG. 8;

FIG. 15 illustrates a state detecting system according to an example embodiment of the present invention;

FIGS. 19A and 19B illustrate an example operation of detecting a first state of the apparatus shown in FIG. 15, performed by the apparatus shown in FIG. 15;

DETAILED DESCRIPTION OF EXAMPLE EMBODIMENTS

Figure 1:
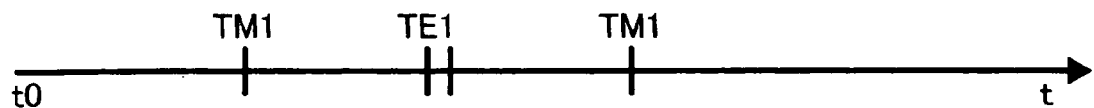
FIG. 1 illustrates an example timing for sending a service person based on a state of an apparatus.
Figure 2:
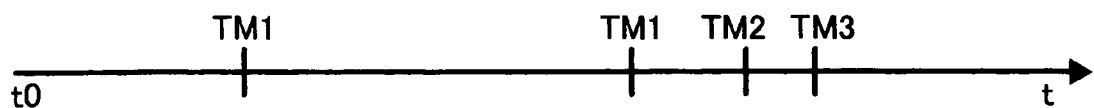
FIG. 2 illustrates an example timing for sending a service person based on a state of an apparatus.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner.

Figure 3:
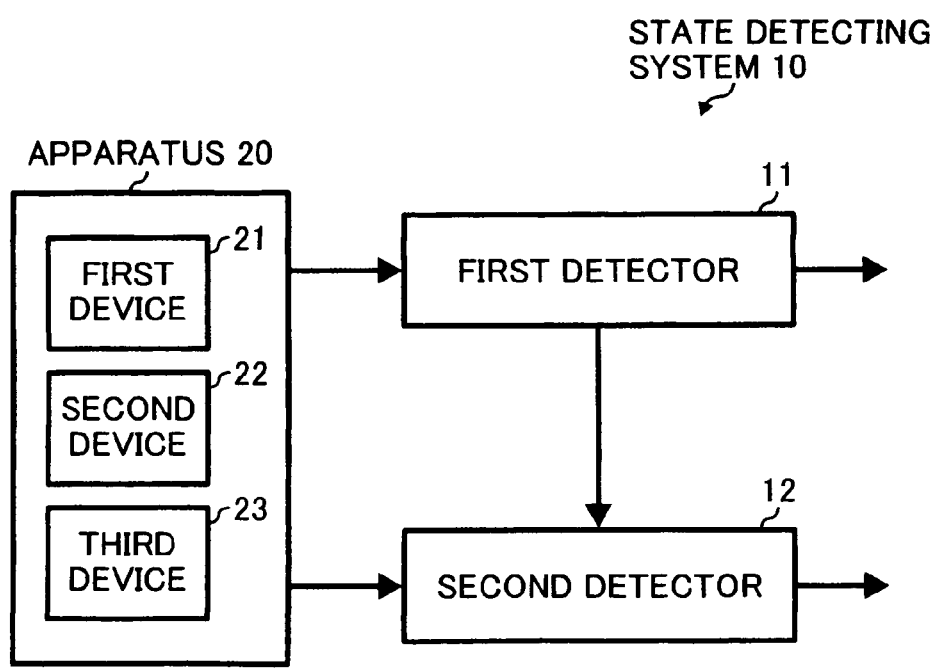
FIG. 3 illustrates a state detecting system according to an example embodiment of the present invention.

Referring now to the drawings, wherein like reference numerals designate identical or corresponding parts throughout the several views, FIG. 3 illustrates a state detecting system 10 according to an example embodiment of the present invention.

As shown in FIG. 3, the state detecting system 10 includes an apparatus 20, a first detector 11, and a second detector 12. The apparatus 20 may be implemented by any kind of apparatus, which includes, for example, a plurality of devices, components, parts, elements, mechanisms, modules, or circuits (collectively referred to as the "plurality of devices"). For the descriptive purpose, the apparatus 20 in this example is assumed to have a first device 21, a second device 22, and a third device 23. The state of the apparatus 20 may be detected by at least one of the first detector 11 and the second detector 12. Examples of the state of the apparatus 20 include, but are not limited to, a past state, a current state, a future state, an error state, a maintenance state, a non-maintenance state, an abnormal state, and a normal state.

Figure 4:
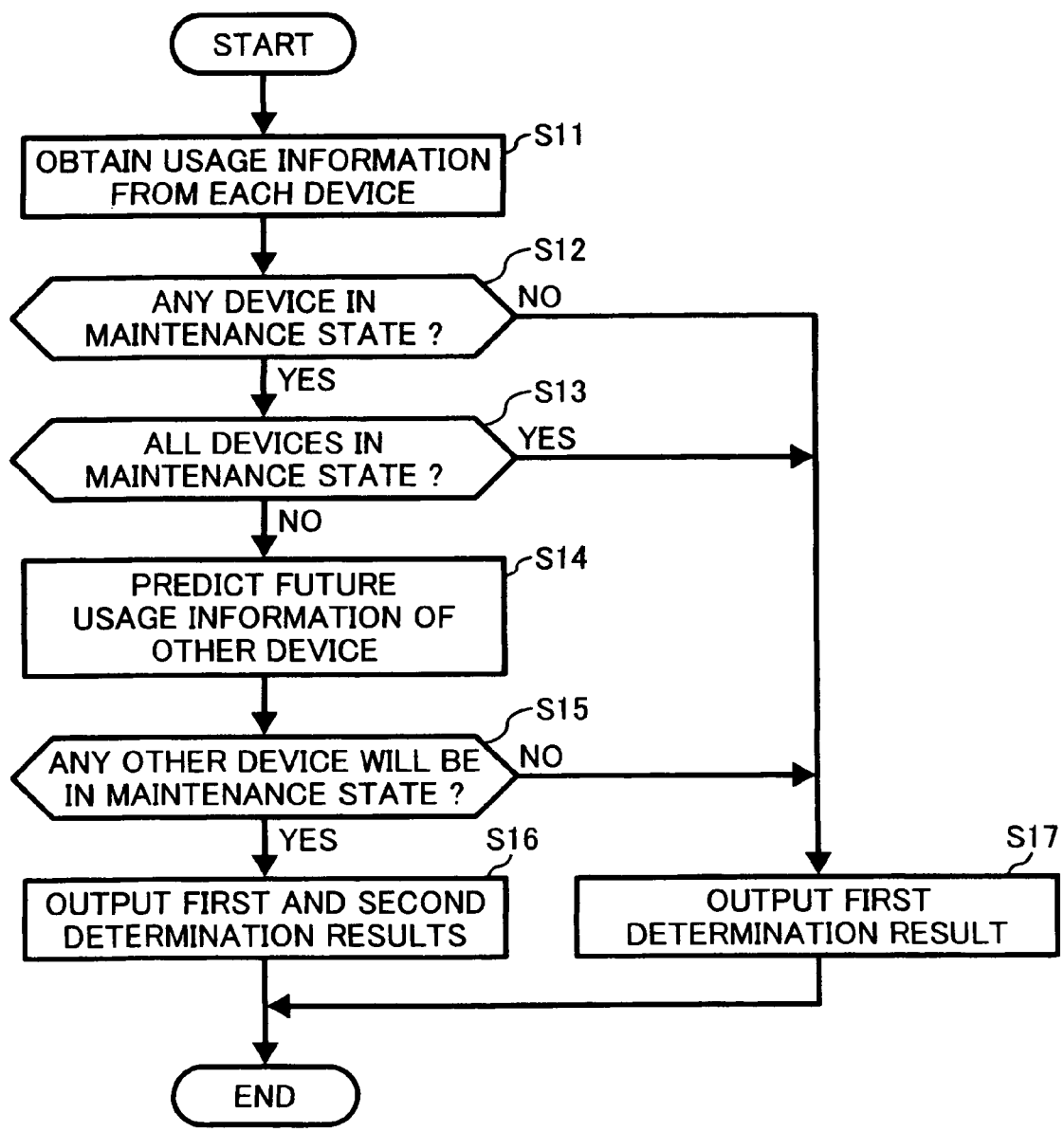
FIG. 4 illustrates an example operation of detecting a state of an apparatus shown in FIG. 3.

As illustrated in FIG. 4, in one example, the state detecting system 10 determines whether any one of the devices in the apparatus 20 is currently in a maintenance state using the first detector 11. When the state detecting system 10 determines that at least one of the devices 21-23, is in the maintenance state, the state detecting system 10 may further determine whether any one of the devices 21-23 in the apparatus 20 will be in the maintenance state within a predetermined time in the future using the second detector 12.

Referring to FIG. 4, at S11, the first detector 11 obtains usage information from each one of the first device 21, the second device 22, and the third device 23. In this example, the usage information of a device may include any kind of information indicating the amount of usage. Such information may include, for example, an amount of time of operation ("the operation time period") of the device during a time period counted from a reference time, or a total amount of operation or work ("the operation amount") performed by the device during the time period counted from the reference time. In this example, the reference time may be obtained as a time when the device is installed or replaced ("the installation time"), a last time when the device received maintenance service ("maintenance time"), or a time when the apparatus was shipped to a current location ("the shipped time").

At S12, the first detector 11 determines whether any one of the first device 21, the second device 22, or the third device 23 is in the maintenance state, by comparing the usage information with a first usage threshold value. In this example, the usage threshold value may indicate a point in time that maintenance or replacement of a device is recommended, substantially due to the long-time use of the device. In this example, the same usage threshold value may be used for all of the devices in the apparatus 20. Alternatively, the usage threshold value may vary from device to device. If the first detector 11 determines that any one of the first device 21, the second device 22, or the third device 23 is in the maintenance state ("YES" at S12), the operation proceeds to S13. Otherwise ("NO" at S12), the operation proceeds to S17 to output a first determination result indicating that none of the devices are in the maintenance state, and the operation ends.

At S13, the first detector 11 determines whether all of the first device 21, the second device 22, and the third device 23 are in the maintenance state. If the first detector 11 determines that all devices are in the maintenance state ("YES" at S13), the operation proceeds to S17 to output a first determination result indicating that all devices are in the maintenance state, and the operation ends. Otherwise ("NO" at S13), the operation proceeds to S14.

At S14, the second detector 12 predicts future usage information of at least one of the first device 21, the second device 22, and the third device 23, which is not determined to be in the maintenance state at S12. For example, if the first detector 11 determines that the first device 21 and the third device 23 are in the maintenance state at S12, the second detector 12 predicts future usage information of the second device 22. For example, the future usage information may be obtained by estimating a future operation time period or amount after a prediction time period passes from the time when the current operation time period or amount is obtained at S11, based on statistical data. The prediction time period may be previously set by default. Alternatively, the prediction time period may be set according to the user preference. Alternatively, the prediction time period may be set by the service provider.

At S15, the second detector 12 determines whether the second device 22 will be in the maintenance state within a predetermined time, for example by comparing the future usage information with the first usage threshold value. If the second detector 12 determines that the second device 22 will be in the maintenance state ("YES" at S15), the operation proceeds to S16 to output a first determination result indicating that the first device 21 and the third device 23 are in the maintenance state, and a second determination result indicating that the second device 22 will be in the maintenance state within a predetermined time, and the operation ends. If the second detector 12 determines that the second device 22 will not be in the maintenance state ("NO" at S15) within the predetermined time, the operation proceeds to S17 to output a first determination result indicating that the first device 21 and the third device 23 are in the maintenance state, and the operation ends. Determining what to set as the "predetermined time" will vary on a case by case basis of specifics of the state detecting system 10.

The operation of FIG. 4 may be performed in various other ways. For example, instead of predicting the future usage information at S14, the second detector 12 may compare the usage information obtained at S11 with a second usage threshold value that is different from the first usage threshold value. In this example, the second usage threshold value sets higher criteria when compared to the first usage threshold value. The second usage threshold value may be set by default. Alternatively, the second usage threshold value may be set according to the preference of the user or the service provider.

Figure 5:
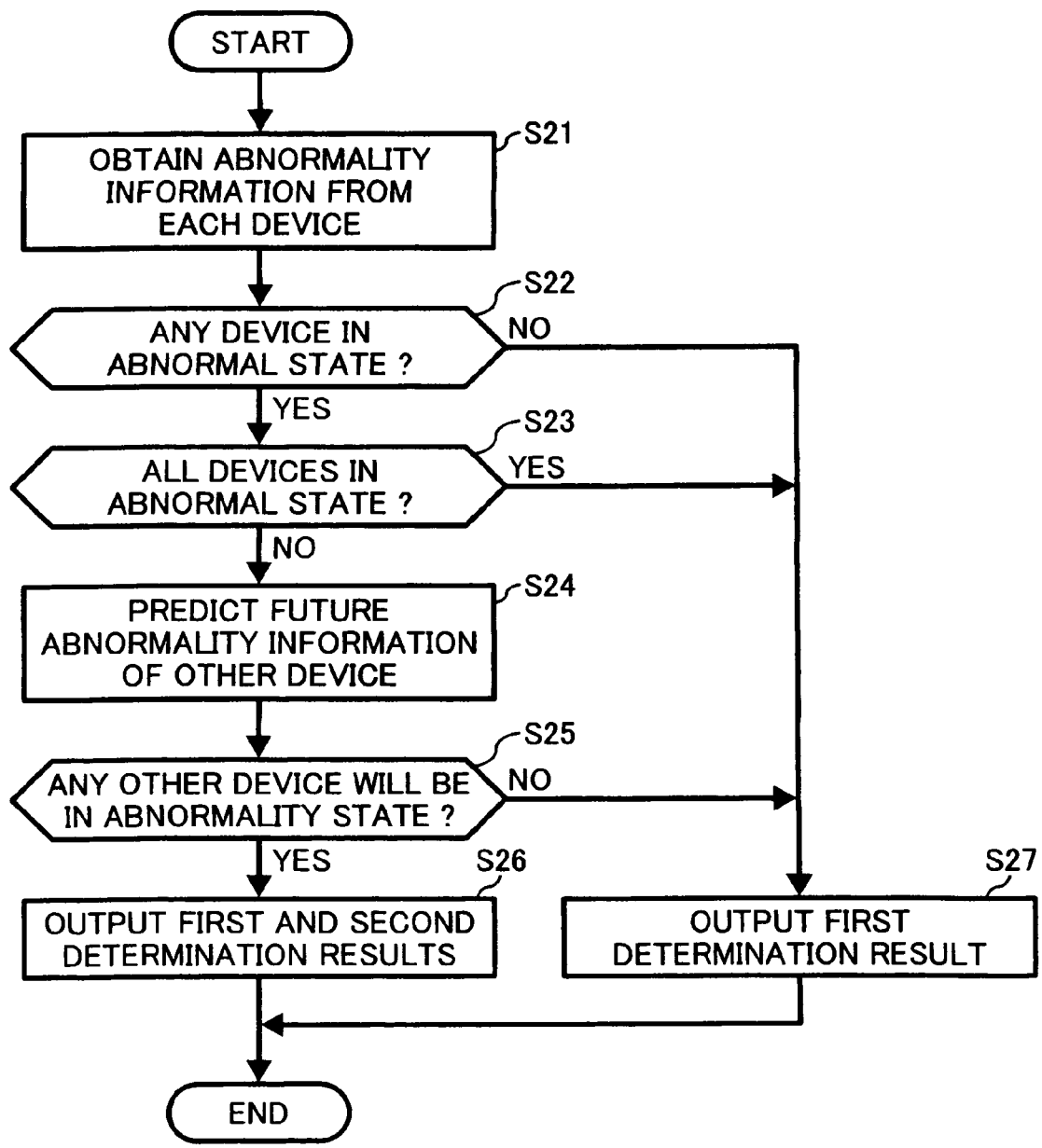
FIG. 5 illustrates an example operation of detecting a state of the apparatus shown in FIG. 3.

In another example, as illustrated in FIG. 5, the state detecting system 10 determines whether any one of the devices in the apparatus 20 is currently in an abnormal state using the first detector 11. When the state detecting system 10 determines that at least one of the devices is in the abnormal state, the state detecting system 10 may further determine whether any one of the devices in the apparatus 20 will be in the abnormal state within a predetermined time in the future using the second detector 12.

Referring to FIG. 5, at S21, the first detector 11 obtains abnormality information from each one of the first device 21, the second device 22, and the third device 23. In this example, abnormality information of a device may include any kind of information indicating the difference between a current state of the device and a normal state of the device. Such information may include, for example, an index value obtained by comparing current state data with normal state data of the apparatus 20, using various kinds of information regarding the apparatus 20. In this example, the current state data, which indicates the current state of the apparatus 20, may be obtained from the apparatus 20 at the time of inspection. The normal state data, which indicates the normal state of the apparatus 20, may also be stored in any kind of storage at the time of inspection. The normal state data may be obtained from the apparatus 20 before the time of inspection, or it may be obtained from any apparatus being in a normal state.

At S22, the first detector 11 determines whether any one of the first device 21, the second device 22, or the third device 23 is in the abnormal state, by comparing the abnormality information with a first abnormality threshold value. In this example, the abnormality threshold value may indicate a point in time that maintenance, replacement, or inspection of a device is recommended due to various reasons. In this example, the same abnormality threshold value may be used for all of the devices in the apparatus 20. Alternatively, the abnormality threshold value may vary from device to device. If the first detector 11 determines that any one of the first device 21, the second device 22, or the third device 23 is in the abnormal state ("YES" at S22), the operation proceeds to S23. Otherwise ("NO" at S22), the operation proceeds to S27 to output a first determination result indicating that none of the devices are in the abnormal state, and the operation ends.

At S23, the first detector 11 determines whether all of the first device 21, the second device 22, and the third device 23 are in the abnormal state. If the first detector 11 determines that all devices are in the abnormal state ("YES" at S23), the operation proceeds to S27 to output a first determination result indicating that all devices are in the abnormal state, and the operation ends. Otherwise ("NO" at S23), the operation proceeds to S24.

At S24, the second detector 12 predicts future abnormality information of at least one of the first device 21, the second device 22, or the third device 23, which is not determined to be in the abnormal state at S22. For example, if the first detector 11 determines that the first device 21 and the third device 23 are in the abnormal state at S22, the second detector 12 predicts future abnormality information of the second device 22. For example, the future abnormality information may be obtained by estimating a future index value after a prediction time period passes from the time when the current index value is obtained at S21, based on statistical data. The prediction time period may be previously set by default. Alternatively, the prediction time period may be set according to user preference.

At S25, the second detector 12 determines whether the second device 22 will be in the abnormal state (which also could be within a predetermined time), for example by comparing the future abnormality information with the first abnormality threshold value. If the second detector 12 determines that the second device 22 will be in the abnormal state ("YES" at S25), the operation proceeds to S26 to output a first determination result indicating that the first device 21 and the third device 23 are in the abnormal state, and a second determination result indicating that the second device 22 will be in the abnormal state, and the operation ends. If the second detector 12 determines that the second device 22 will not be in the abnormal state ("NO" at S25), the operation proceeds to S27 to output a first determination result indicating that the first device 21 and the third device 23 are in the abnormal state, and the operation ends.

The operation of FIG. 5 may be performed in various other ways. For example, instead of predicting the future abnormality information at S24, the second detector 12 may compare the abnormality information obtained at S21 with a second abnormality threshold value that is different from the first abnormality threshold value. Preferably, the second abnormality threshold value sets higher criteria compared to the first abnormality threshold value. The second abnormality threshold value may be set by default. Alternatively, the second abnormality threshold value may be set according to the preference of the user or the service provider.

In another example, instead of predicting the future abnormality information at S24, the second detector 12 may recalculate the abnormality information using normal state data (referred to as "the adjusted normal state data"), which is different from the normal state data used at S21. For example, the adjusted normal state data may be obtained before the time when the normal state data is obtained. Accordingly, the resultant abnormality information may be obtained with higher criteria, compared to the abnormality information obtained at S21.

Figure 6:
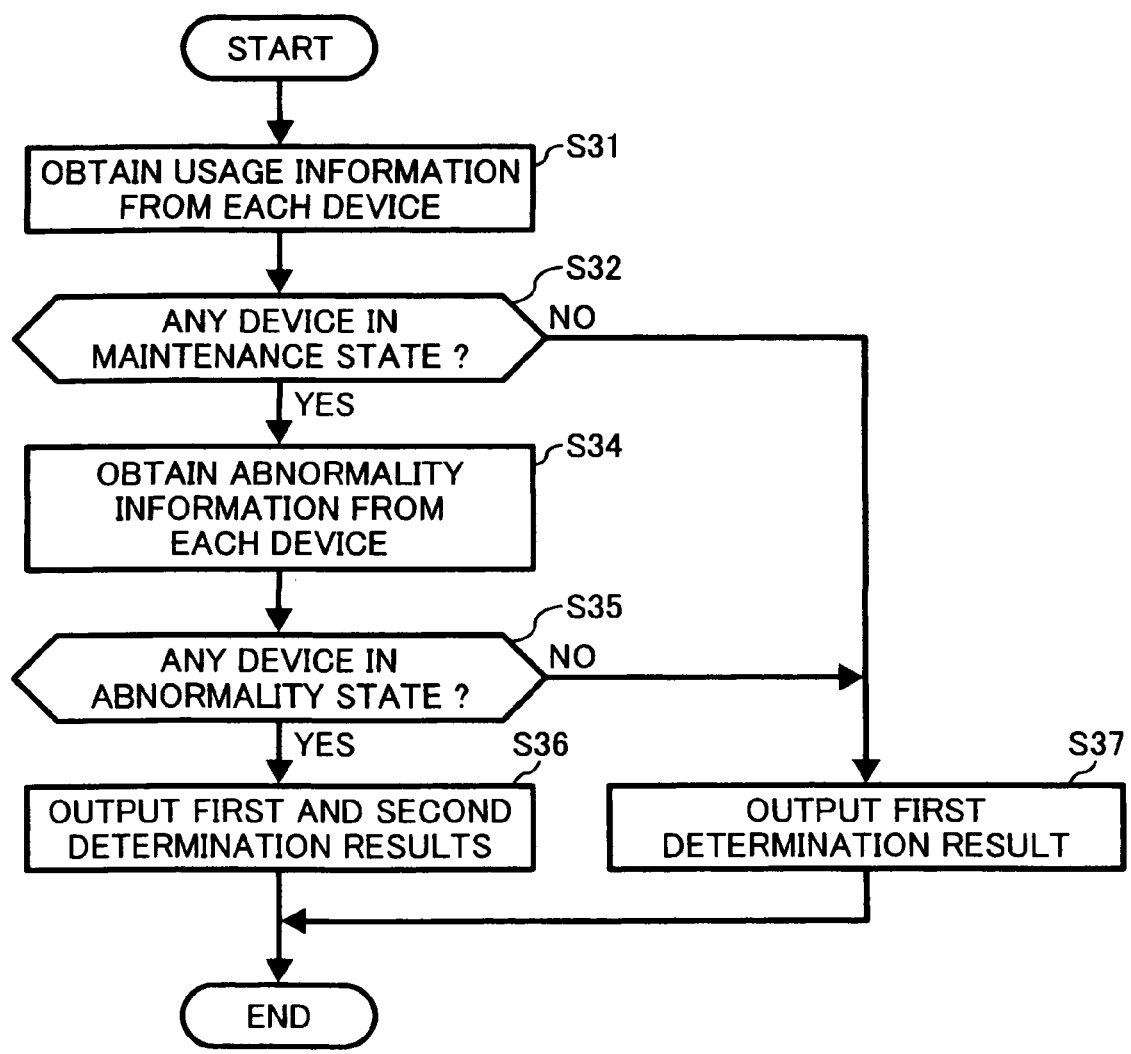
FIG. 6 illustrates an example operation of detecting a state of the apparatus shown in FIG. 3.

In another example, as illustrated in FIG. 6, the state detecting system 10 determines whether any one of the devices in the apparatus 20 is in the maintenance state using the first detector 11. When the state detecting system 10 determines that at least one of the devices is in the maintenance state, the state detecting system 10 may further determine whether any one of the devices in the apparatus 20 is in the abnormal state using the second detector 12.

Referring to FIG. 6, at S31, the first detector 11 obtains usage information from each one of the first device 21, the second device 22, and the third device 23 in a substantially similar manner as described above referring to S11 of FIG. 4.

At S32, the first detector 11 determines whether any one of the first device 21, the second device 22, or the third device 23 is in the maintenance state, for example by comparing the usage information with a first usage threshold value, in a substantially similar manner as described above referring to S12 of FIG. 4. If the first detector 11 determines that any one of the first device 21, the second device 22, or the third device 23 is in the maintenance state ("YES" at S32), the operation proceeds to S34. Otherwise ("NO" at S32), the operation proceeds to S37 to output a first determination result indicating that none of the devices are in the maintenance state, and the operation ends.

At S34, the second detector 12 obtains abnormality information from each one of the first device 21, the second device 22, and the third device 23, in a substantially similar manner as described above referring to S21 of FIG. 5.

At S35, the second detector 12 determines whether any one of the first device 21, second device 22, or the third device 23 is in the abnormal state, for example by comparing the abnormality information with a first abnormality threshold value, in a substantially similar manner as described referring to S22 of FIG. 5. If the second detector 12 determines that any one of the devices is in the abnormal state ("YES" at S35), the operation proceeds to S36 to output a first determination result indicating that at least one of the devices is in the maintenance state, and a second determination result indicating that at least one of the devices is in the abnormal state, and the operation ends. Otherwise ("NO" at S35), the operation proceeds to S37 to output a first determination result indicating that at least one of the devices is in the maintenance state, and the operation ends.

The operation of FIG. 6 may be performed in various other ways. For example, instead of detecting the maintenance state at S32 and the abnormal state at S35, the state detecting system 10 may detect any other combination of different kinds of states of the apparatus 20. In another example, instead of obtaining abnormality information from each device at S34, the second detector 12 may obtain abnormality information from at least one device, which is not determined to be in the maintenance state at S32. In another example, the state detecting system 10 may further determine another kind of state of the apparatus 20 in addition to the maintenance state or the abnormal state.

Figure 7:
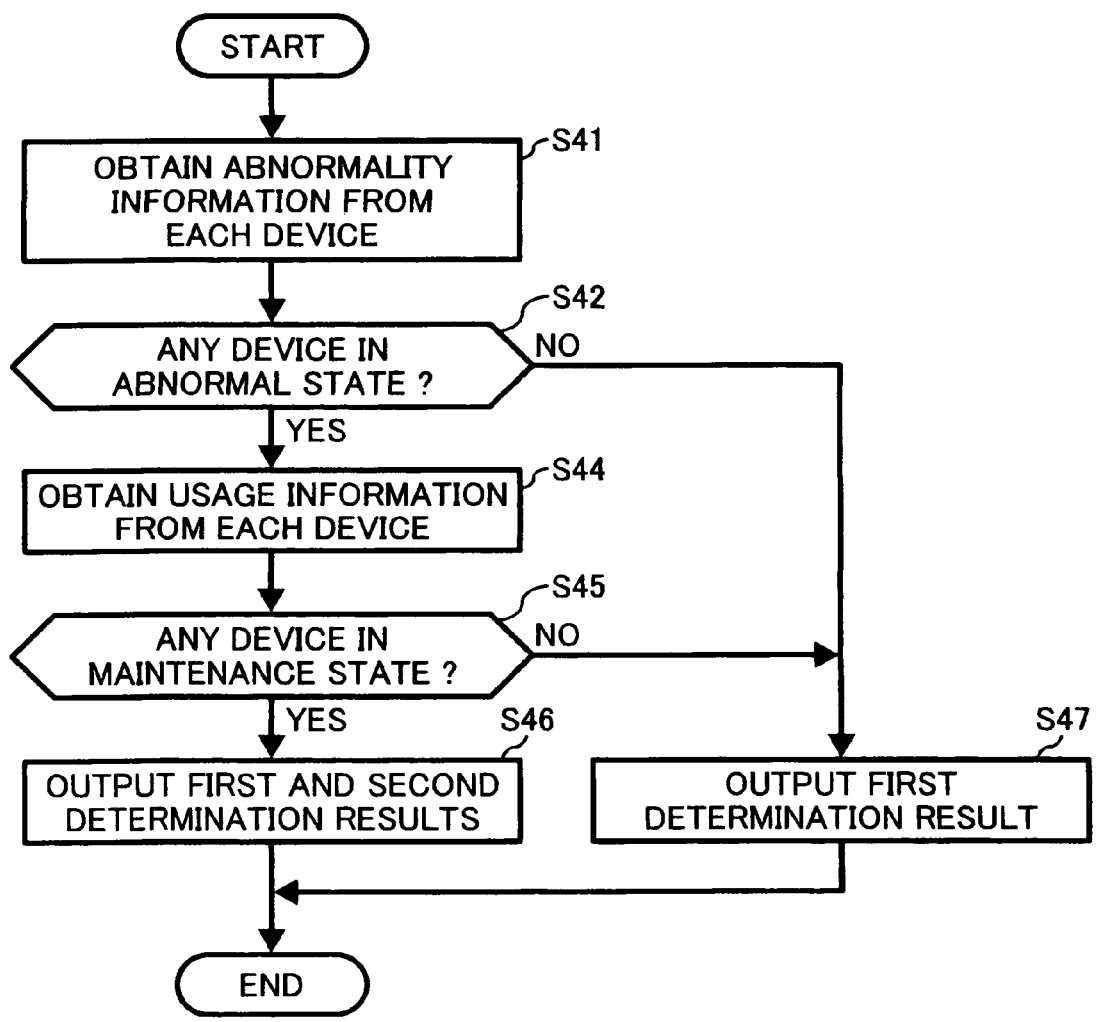
FIG. 7 illustrates an example operation of detecting a state of the apparatus shown in FIG. 3.

In another example, as illustrated in FIG. 7, the state detecting system 10 determines whether any one of the devices in the apparatus 20 is in the abnormal state using the first detector 11. When the state detecting system 10 determines that at least one of the devices is in the maintenance state, the state detecting system 10 may further determine whether any one of the devices in the apparatus 20 is in the maintenance state using the second detector 12.

Referring to FIG. 7, at S41, the first detector 11 obtains abnormality information from each one of the first device 21, the second device 22, and the third device 23 in a substantially similar manner as described above referring to S21 of FIG. 5.

At S42, the first detector 11 determines whether any one of the first device 21, the second device 22, or the third device 23 is in the abnormal state, for example, by comparing the abnormality information with a first abnormality threshold value, in a substantially similar manner as described above referring to S22 of FIG. 5. If the first detector 11 determines that any one of the first device 21, the second device 22, or the third device 23 is in the abnormal state ("YES" at S42), the operation proceeds to S44. Otherwise ("NO" at S42), the operation proceeds to S47 to output a first determination result indicating that none of the devices are in the abnormal state, and the operation ends.

At S44, the second detector 12 obtains usage information from each one of the first device 21, the second device 22, and the third device 23, in a substantially similar manner as described above referring to S11 of FIG. 4.

At S45, the second detector 12 determines whether any one of the first device 21, the second device 22, or the third device 23 is in the maintenance state, for example by comparing the usage information with a first usage threshold value, in a substantially similar manner as described above referring to S12 of FIG. 4. If the second detector 12 determines that any one of the devices in the apparatus 20 is in the maintenance state ("YES" at S45), the operation proceeds to S46 to output a first determination result indicating that at least one of the devices is in the abnormal state, and a second determination result that at least one of the devices is in the maintenance state, and the operation ends. Otherwise ("NO" at S45), the operation proceeds to S47 to output a first determination result indicating that at least one of the devices is in the abnormal state, and the operation ends.

The operation of FIG. 7 may be performed in various other ways. For example, instead of detecting the abnormal state at S42 and the maintenance state at S45, the state detecting system 10 may detect any other combination of different kinds of states of the apparatus 20. In another example, instead of obtaining usage information from each device at S44, the second detector 12 may obtain usage information from at least one device, which is not determined to be in the abnormal state at S42. In another example, the state detecting system 10 may further determine another kind of state of the apparatus 20 in addition to the maintenance state and the abnormal state.

The state detecting system 10 of FIG. 3 may be implemented in various ways, for example, as one apparatus, or more than one apparatus, as described below or as apparent to those skilled in the art.

In one example, the first detector 11 and the second detector 12 may be incorporated together as one detector. In another example, the first detector 11, the second detector 12, and the apparatus 20 may be implemented as one apparatus. In another example, any one of the first determination result and the second determination result may be output through an output device, which may be additionally provided in the state detecting system 10. In another example, the first detector 11 and the second detector 12 may be controlled by a detector selector or a switch, which may be additionally provided in the state detecting system 10.

Referring now to FIGS. 8 to 14, example operations of detecting a state of an image forming apparatus are explained. In this example, the above-described functions of the state detecting system 10 of FIG. 3 are performed by one apparatus, which is the image forming apparatus.

The image forming apparatus may have any kind of structure, for example as illustrated in any one of the US Patent Application Publication Nos. 2005/0281596 published on Dec. 22, 2005, 2005/0154562; published on Jul. 14, 2005, 2005/0286916 published on Dec. 29, 2005, and 2005/0002054 published on Jan. 6, 2005, the entire contents of each of which are hereby incorporated herein by reference.

Figure 8:
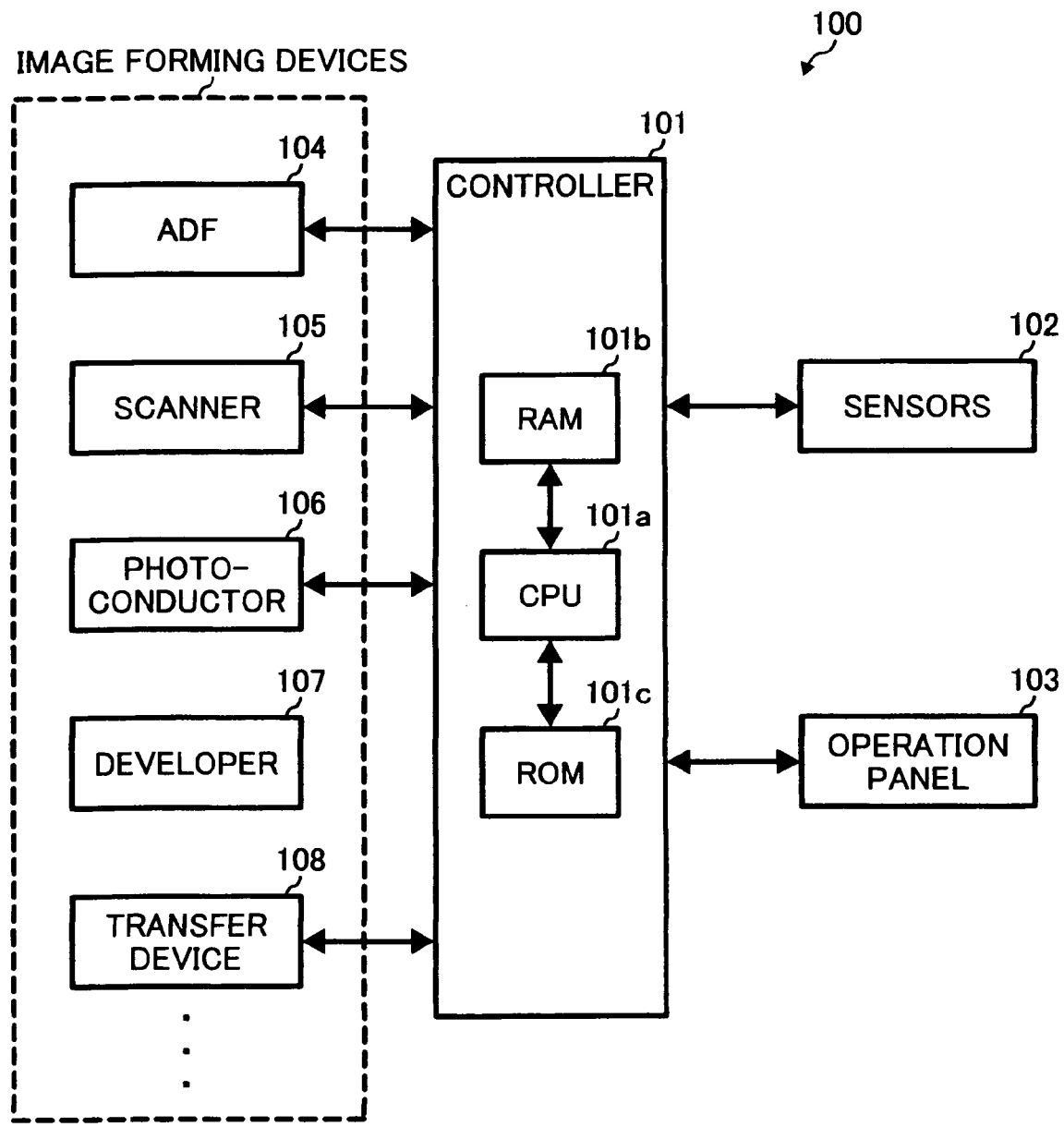
FIG. 8 illustrates an example image forming apparatus functioning as the apparatus shown in FIG. 3.

For example, as illustrated in FIG. 8, the image forming apparatus 100 includes a controller 101, various sensors 102, an operation panel 103, and various image forming devices including an automatic document feeder (ADF) 104, a scanner 105, a photoconductor 106, a developer 107, a transfer device 108, etc.

The controller 101 controls operation of the image forming apparatus 100. In this example, the controller 101 includes a central processing unit (CPU) 101a, a random access memory (RAM) 101b, and a read only memory (ROM) 101c. The CPU 101a may be implemented by any kind of processor. The RAM 101b functions as a work memory for the CPU 101a. The ROM 101c is capable of storing various data.

The sensors 102 may obtain information regarding the image forming apparatus 100, which may be used to detect a state of the image forming apparatus 100. Examples of the sensors 102 include, but are not limited to, a temperature sensor, a humidity sensor, an oscillation sensor, an optical sensor, a potential sensor, a timer, an ammeter, a voltmeter, a size detector, and an image detector.

The operation panel 103 may include an input device allowing a user to input information and/or an output device outputting information to the user. For example, the input device may be provided with a plurality of keys or buttons, for example, in the form of keyboard or touch panel. The output device may be provided with a display, for example a liquid crystal display, a speaker, a lighting device, etc.

The ADF 104 feeds a document. The scanner 105 scans the document, which may be fed by the ADF 104, into image data. The photoconductor 106 carries a latent image or a toner image, which is generated based on the image data. The developer 107 develops the latent image into the toner image. The transfer device 108 transfers a recording medium, for example a recording sheet. The image forming apparatus 100 may be additionally provided with any devices other than the above-described devices.

Figure 9B:
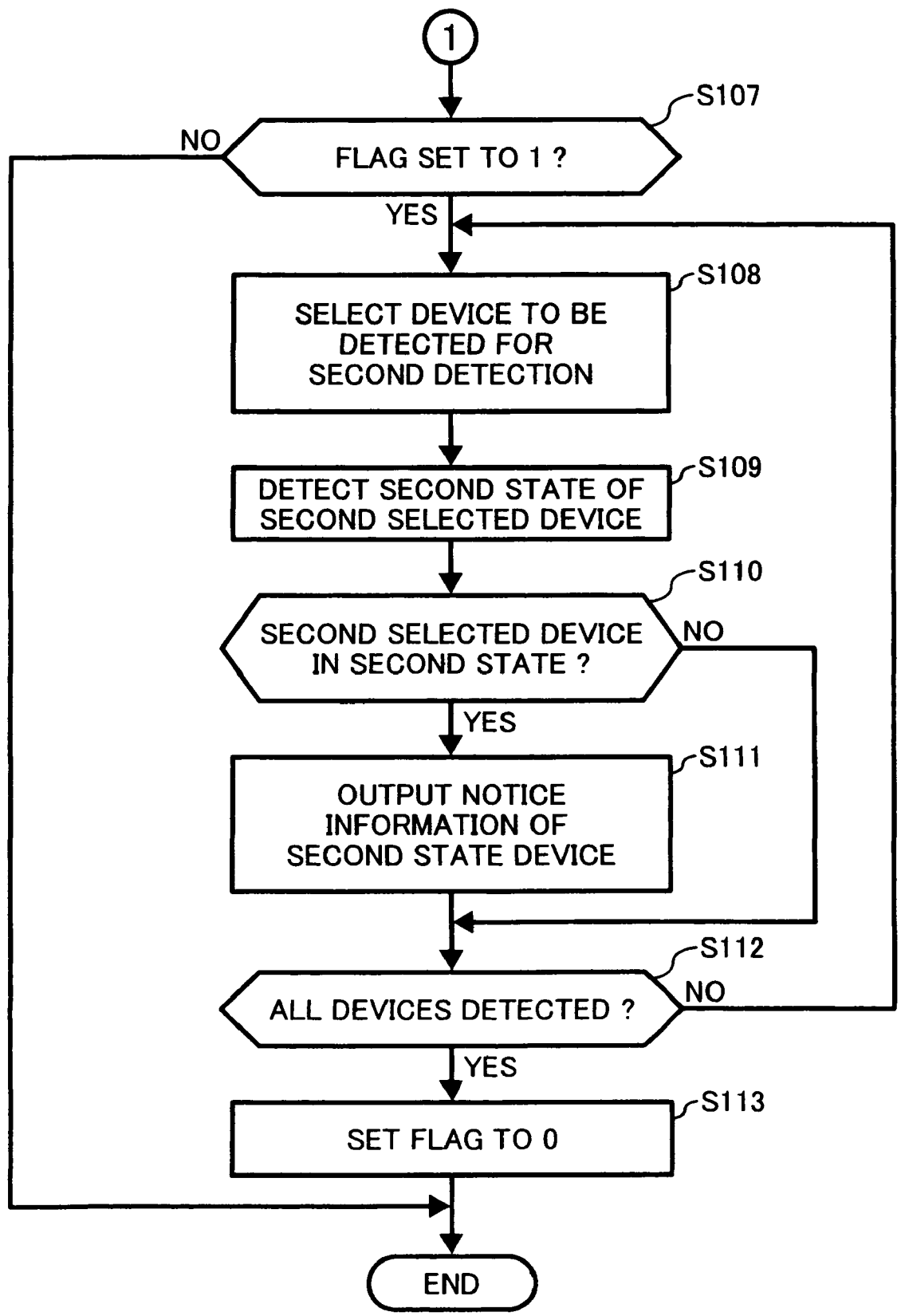

Referring now to FIGS. 9A and 9B, an example operation of detecting a state of the image forming apparatus 100 is explained. In one example, the operation of FIGS. 9A and 9B may be performed by the controller 101 shown in FIG. 8. For example, when the CPU 101a is activated, the CPU 101a loads a state detecting program, which may be stored in the ROM 101b, onto the RAM 101c. In this example, the state detecting program may be obtained in various ways. In one example, the state detecting program may be obtained from any other memory or storage device in the image forming apparatus 100. Alternatively, the state detecting program may be downloaded from an external storage device via a terminal of the user, when the image forming apparatus 100 is connected to the user terminal. Alternatively, the state detecting program may be downloaded from any kind of removable medium accessible from the image forming apparatus 100.

Referring to FIG. 9A, at S101, the controller 101 selects one or more devices to be detected ("the first selected device") from a plurality of devices in the image forming apparatus 100. In one example, the controller 101 may select a predetermined set of devices based on the type of characteristics of the image forming apparatus 100, which will be inspected. For example, if the photoconductor characteristics of the image forming apparatus 100 is to be inspected, one or more devices relating to the photoconductor characteristics may be selected from the image forming devices, for example the photoconductor 106 shown in FIG. 8. Additionally or alternatively, one or more sensors capable of obtaining information relating to the photoconductor characteristics may be selected from the sensors 102.

At S102, the controller 101 obtains first information regarding the first selected device, and stores the obtained information in the ROM 101b or the RAM 101c. In one example, the controller 101 obtains usage information from the first selected device. For example, when the first selected device relating to the photoconductor characteristics is selected, an operation time period of the photoconductor 106 may be obtained using at least one of the sensors 102 as the usage information. In another example, the controller 101 obtains abnormality information from the first selected device. For example, when the first selected device relating to the photoconductor characteristics is selected, a combination of data including a temperature of the apparatus 100, humidity of the apparatus 100, potential of the photoconductor 106, toner amount on the recording sheet, current of the photoconductor 106, etc. may be obtained using at least one of the sensors 102 as the abnormality information. The type of the first information, such as the usage information or the abnormality information, may be previously determined by default. Alternatively, the type of the first information may be set according to user preference, which may be input through the operation panel 103.

At S103, the controller 101 determines whether the first selected device is in the first state, for example, by comparing the first information with a first threshold value. The result obtained at S103 may be stored as a first determination result in the RAM 101b. In one example, the controller 101 determines whether the first selected device is in a maintenance state by comparing the usage information obtained at S102 with a first usage threshold value. In another example, the controller 101 determines whether the first selected device is in an abnormal state by comparing the abnormality information obtained at S102 with a first abnormality threshold value. The first threshold value, such as the first usage threshold value or the first abnormality threshold value, may be previously stored in the ROM 101c, or any kind of storage device or medium. Alternatively, the first threshold value, such as the first usage threshold value or the first abnormality threshold value, may be input by the user through the operation panel 103. At S103, if the controller 101 determines that the first selected device is in the first state ("YES" at S103), the operation proceeds to S104. If the controller 101 determines that the first selected device is not in the first state ("NO" at S103), the operation proceeds to S106.

At S104, the controller 101 sets the value of a flag to 1. The value of the flag may be a binary value or code, which indicates the status of the controller 101.

At S105, the controller 101 outputs notice information regarding the first selected device that is determined to be in the first state at S103. For example, if the developer 107, which is the first selected device, is determined to be in the maintenance state, the controller 101 outputs notice information indicating that the developer 107 is in the maintenance state. In this example, the controller 101 may select one of various kinds of notice information, which may be stored in the ROM 101b or any other kind of memory according to the first determination result obtained at S103. The notice information may be displayed as a message on the operation panel 103. The message may contain advisory information, such as "Please call your service provider" or "Please replace the developer".

The notice information may be output in various other ways. The notice information may be output as a sound or a voice message, if a speaker is provided with the operation panel 103. The notice information may be output as a flashing light, if a lighting device is provided with the operation panel 103. The notice information may be output as a printed document using one or more of the image forming devices shown in FIG. 8. The notice information may be stored in any kind of storage or medium. The notice information may be sent to a user terminal, which may be connected to the image forming apparatus 100.

At S105, in addition to outputting the notice information, the controller 101 may cause the image forming apparatus 100 to operate in a different mode. In one example, the controller 101 may cause the apparatus 100 to stop operation. In another example, the controller 101 may cause the apparatus 100 to perform image formation differently, for example, by changing image forming speeds or image forming parameters. In another example, the controller 101 may cause the apparatus 100 to perform calibration.

At S106, the controller 101 determines whether all devices in the image forming apparatus 100 have been detected at S103. If all devices have been detected ("YES" at S106), the operation proceeds to S107 of FIG. 9B. Otherwise ("NO" at S106), the operation returns to S101. For example, if the first selected device relating to the photoconductor characteristics is firstly selected as described above, the controller 101 may select another type of characteristics of the image forming apparatus 100 to be inspected next, for example, the sheet transfer characteristics of the image forming apparatus 100. To inspect the sheet transfer characteristics, the controller 101 returns to S101 to select a first selected device relating to the sheet transfer characteristics, such as the transfer device 108 shown in FIG. 8. In this manner, all devices or characteristics of the image forming apparatus 100 may be inspected.

Referring to FIG. 9B, at S107, the controller 101 determines whether the value of the flag is set to 1. If the flag value is set to 1 ("YES" at S107), the operation proceeds to S108. If the flag value is set to 0 ("NO" at S107), the operation ends.

At S108, the controller 101 selects one or more devices to be detected ("the second selected device") from the plurality of devices in the image forming apparatus 100. In this example, the controller 101 may select one or more devices from a group of devices, which are not determined to be in the first state at S103, in a substantially similar manner as described above referring to S101. For example, if the photoconductor 106, which is selected as the first selected device, is determined to be in the first state at S103, the controller 101 may select one or more devices other than the photoconductor 106 from the image forming devices of FIG. 8.

At S109, the controller 101 obtains second information regarding the second selected device, and stores the obtained information in the ROM 101b or the RAM 101c. In one example, the controller 101 obtains abnormality information from the second selected device, when the maintenance state is detected at S103. For example, when the second selected device relating to the developer characteristics is selected, a combination of data including a temperature of the apparatus 100, humidity of the apparatus 100, toner density, toner amount, potential of the photoconductor 106, etc. may be obtained using at least one of the sensors 102. In another example, the controller 101 obtains usage information from the second selected device, when the abnormal state is detected at S103. For example, when the second selected device relating to the developer characteristics is selected, the amount of toner in the developer 107 may be obtained using at least one of the sensors 106.

In another example, the controller 101 may obtain future usage information of the second selected device, when the maintenance state is detected at S103. The future usage information may be predicted from the first usage information of the second selected device obtained at S102. In another example, the controller 101 may obtain future abnormality information of the second selected device, when the abnormal state is detected at S103. The future abnormality information may be predicted from the first abnormality information of the second selected device obtained at S102.

At S110, the controller 101 determines whether the second selected device is in the second state, for example by comparing the second information with a second threshold value. The result obtained at S110 may be stored as a second determination result in the RAM 101b or any other kind of memory. In one example, the controller 101 determines whether the second selected device is in a maintenance state by comparing the usage information obtained at S109 with a second usage threshold value that is different from the first usage threshold value. In another example, the controller 101 determines whether the second selected device is in an abnormal state by comparing the abnormality information obtained at S109 with a second abnormality threshold value that is different from the first abnormality threshold value. In another example, the controller 101 determines whether the second selected device will be in a maintenance state within a predetermined time by comparing the future usage information obtained at S109 with the first usage threshold value. In another example, the controller 101 determines whether the second selected device will be in an abnormal state (which could also be within a predetermined time) by comparing the future abnormality information obtained at S109 with the first abnormality threshold value.

At S111, the controller 101 outputs notice information regarding the second selected device, which is determined to be in the second state at S110, in a substantially similar manner as described above referring to S105 of FIG. 9A. In this example, the controller 101 may select one of various kinds of notice information, which may be stored in the ROM 101b or any other kind of memory according to the second determination result obtained at S110.

At S112, the controller 101 determines whether all devices in the image forming apparatus 100, except for the first selected device that is determined to be in the first state, have been detected at S110. If all devices have been detected ("YES" at S112), the operation proceeds to S113. Otherwise ("NO" at S112), the operation returns to S108 to select another second selected device in a substantially similar manner as described above referring to S106 of FIG. 9A. In this manner, all devices or characteristics of the image forming apparatus 100 may be inspected.

At S113, the controller 101 sets the value of the flag to 0, and the operation ends.

The operation of FIGS. 9A and 9B may be performed in various other ways. For example, S106 or S112 of determining whether all devices have been detected may not be performed. In another example, S101 of selecting the first selected device may be automatically set to all devices, or substantially all devices, of the image forming apparatus 100.

In such a case, at S102, the controller 101 obtains all, or substantially all, kinds of information from the apparatus 100. In another example, S108 of selecting the second selected device may be automatically set to all devices, or substantially all devices, of the image forming apparatus 100 except for the device that is determined to be in the first state. In another example, S104 of changing the flag value may not be performed as long as the controller 101 is capable of determining whether to proceed with the operation. In another example, any other kind of state may be detected at S103 or S110.

In another example, the operation of detecting a state of the image forming apparatus 100, such as the operation of FIGS. 9A and 9B, may be performed by one or more detectors, which may be incorporated in the image forming apparatus 100. In this example, the detectors 102 function as the first detector 11 or the second detector 12 of FIG. 3.

For the descriptive purpose, the first detector 11 is assumed to determine whether any one of the devices in the image forming apparatus 100 is in a maintenance state, while the second detector 12 is assumed to determine whether any one of the devices in the image forming apparatus 100 is in the abnormal state. In such a case, the first detector 11 may have a structure substantially similar to a structure 30 shown in FIG. 10. The second detector 12 may have a structure substantially similar to a structure 40 shown in FIG. 12.

Figure 10:
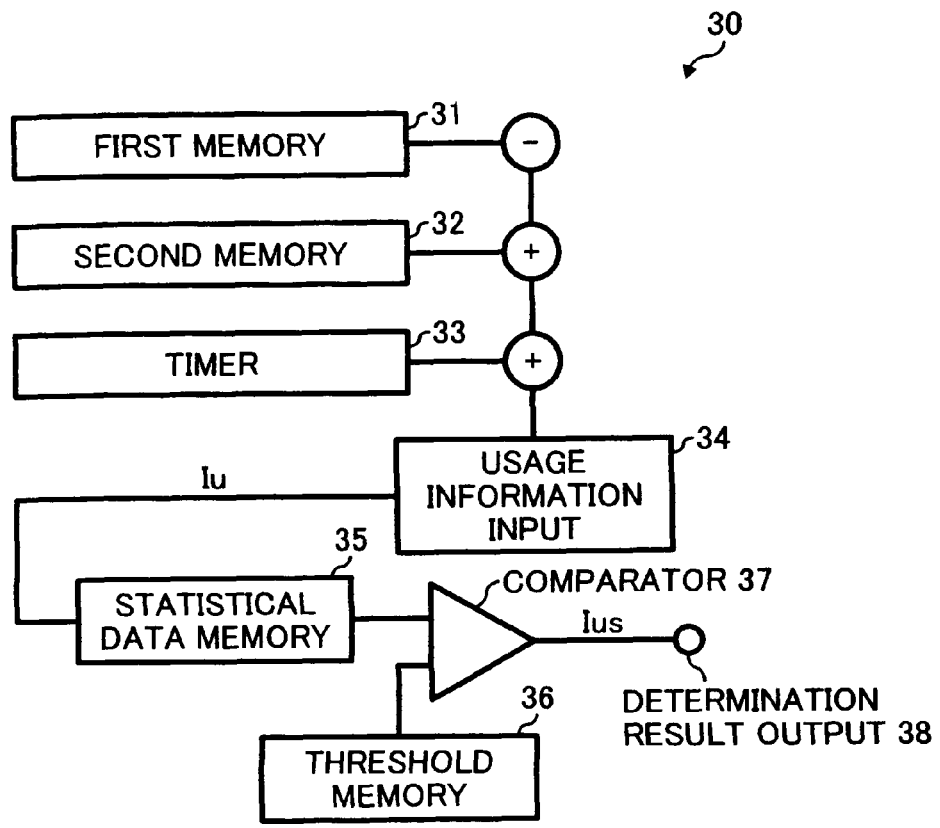
FIG. 10 illustrates an example structure of at least one of a first detector and a second detector shown in FIG. 3.

Referring to FIG. 10, the first detector 11 of the structure 30 obtains an operation time period of at least one device of the apparatus 100, which may be selected as a first selected device in a substantially similar manner described above referring to S101 of FIG. 9A. In this example, the operation time period is used as the usage information or the first information of the first selected device, which is described above referring to S102 of FIG. 9A. The structure 30 includes a first memory 31, a second memory 32, a timer 33, a usage information input 34, a statistical data memory 35, a threshold memory 36, a comparator 37, and a determination result output 38.

The first memory 31 stores information regarding a reference time, from which a time period is counted to obtain the operation time period. The reference time includes, for example, the installation time, maintenance time, shipped time, etc., as described above referring to FIG. 4.

The second memory 32 stores information regarding a prediction time, which may be used to obtain future usage information, such as a future operation time period. Since the first detector 11 obtains the current operation time period in this example, the prediction time is set to 0. Alternatively, the second memory 32 may not be provided in the first detector 11, if the first detector 11 is not used to obtain any future information.

The timer 33 obtains information regarding a current time when the first selected device of the apparatus 100 is being inspected, such as a current date.

In this example, the usage information input 34 obtains the operation time period (indicated by "Iu" in FIG. 10) of the first selected device by subtracting the reference time from the sum of the prediction time and the current time. At this time, the usage information input 34 may store the operation time period. The operation time period may be expressed in seconds, minutes, hours, dates, months, etc.

Figure 11:
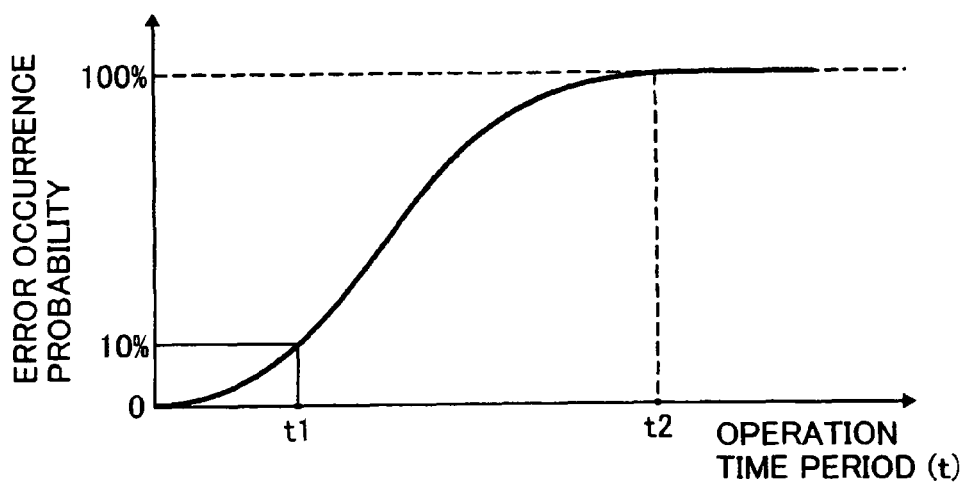
FIG. 11 illustrates example statistical data stored in the image forming apparatus shown in FIG. 8.

As illustrated in FIG. 10, in this example, the operation time period is converted to the percentage value of the error occurrence probability, using statistical data stored in the statistical data memory 35. The statistical data memory 35 may store one or more statistical data, each statistical data indicating the correspondence between the operation time period and the error occurrence probability of a specific device in the image forming apparatus 100. In this example, the statistical data shown in FIG. 11, which indicates the correspondence between the operation tine period and the error occurrence probability of the first selected device is used. Referring to FIG. 11, the probability of the first selected device for causing an error is 100% when the operation time period of the first selected device reaches the point t2. Alternatively, the statistical data memory 35 may obtain or store statistical data indicating the correspondence between the operation time period and the error occurrence probability of a device in general, which may be commonly used for any of the devices in the apparatus 100.

The comparator 37 compares the percentage value converted from the operation time period of the first selected device, with a threshold percentage value stored in the threshold memory 36 to generate a comparison result. In this example, the threshold percentage value, which functions as the first usage threshold value or the first threshold value described referring to S103 of FIG. 9A, is previously set to 10%. Alternatively, the threshold percentage value may be set according to user preference. Alternatively, the threshold percentage value may be selected from one or more threshold percentage values, which may be stored in the threshold memory 36, for example, according to the type of the first selected device.

The determination result output 38 receives the comparison result and outputs a first determination result. For example, if the comparison result indicates that the percentage value of the first selected device is less than 10%, the determination result output 38 outputs a first determination result indicating that the first selected device is not in the maintenance state. If the comparison result indicates that the percentage value of the first selected device is equal to or greater than 10%, the determination result output 38 outputs a first determination result indicating that the first selected device is in the maintenance state.

In this example, when the first determination result indicates that the first selected device is in the maintenance state, the determination result output 38 may output a notification signal to the second detector 12 of FIG. 3. With this notification signal, the second detector 12 may determine whether to perform an operation of determining a second state of the image forming apparatus 100. For example, if the notification signal is received, the second detector 12 performs an operation. If the notification signal is not received, the second detector 12 does not perform any operation.

In this example, the first determination result, generated by the determination result output 38, may be further converted to notice information, which may be output in various ways.

The structure of the first detector 11 may be implemented in various other ways.

In one example, instead of converting the operation time period of the first selected device, the first detector 11 may be implemented such that the threshold percentage value 10% is converted to an operation time period t1 using the statistical data, as illustrated in FIG. 11. In such a case, the first selected device is determined to be in the maintenance state if the operation time period t is equal to or greater than the operation time period t1.

In another example, instead of obtaining the operation time period, the first detector 11 may obtain an operation amount of the first selected device. In such a case, the first memory 31, the second memory 33, or the usage information input 34 may not be provided. Further, the timer 33 may be replaced by a detector capable of detecting the operation amount of the first selected device. For example, if the photoconductor 106 is selected as the first selected device, the operation amount of the photoconductor 106 may be detected by a counter, which counts the number of rotations of the photoconductor 106, if the photoconductor 106 is assumed to rotate one revolution every time it performs image formation on one recording sheet. In another example, if the transfer device 108 is selected as the first selected device, the operation amount of the transfer device 108 may be detected by a counter, which counts the number of rotations of the transfer device 108, if the transfer device 108 is assumed to rotate one revolution every time it performs image formation on one recording sheet. The operation amount may be compared with a threshold operation amount, which may be previously set. In such a case, the statistical data memory 35 stores statistical data, which indicates the correspondence between the error currency probability and the operation amount. For example, if the counted value obtained by the detector is greater than the counted value of the threshold operation amount, such as 20,000, the first selected device is determined to be in the maintenance state.

Figure 12:
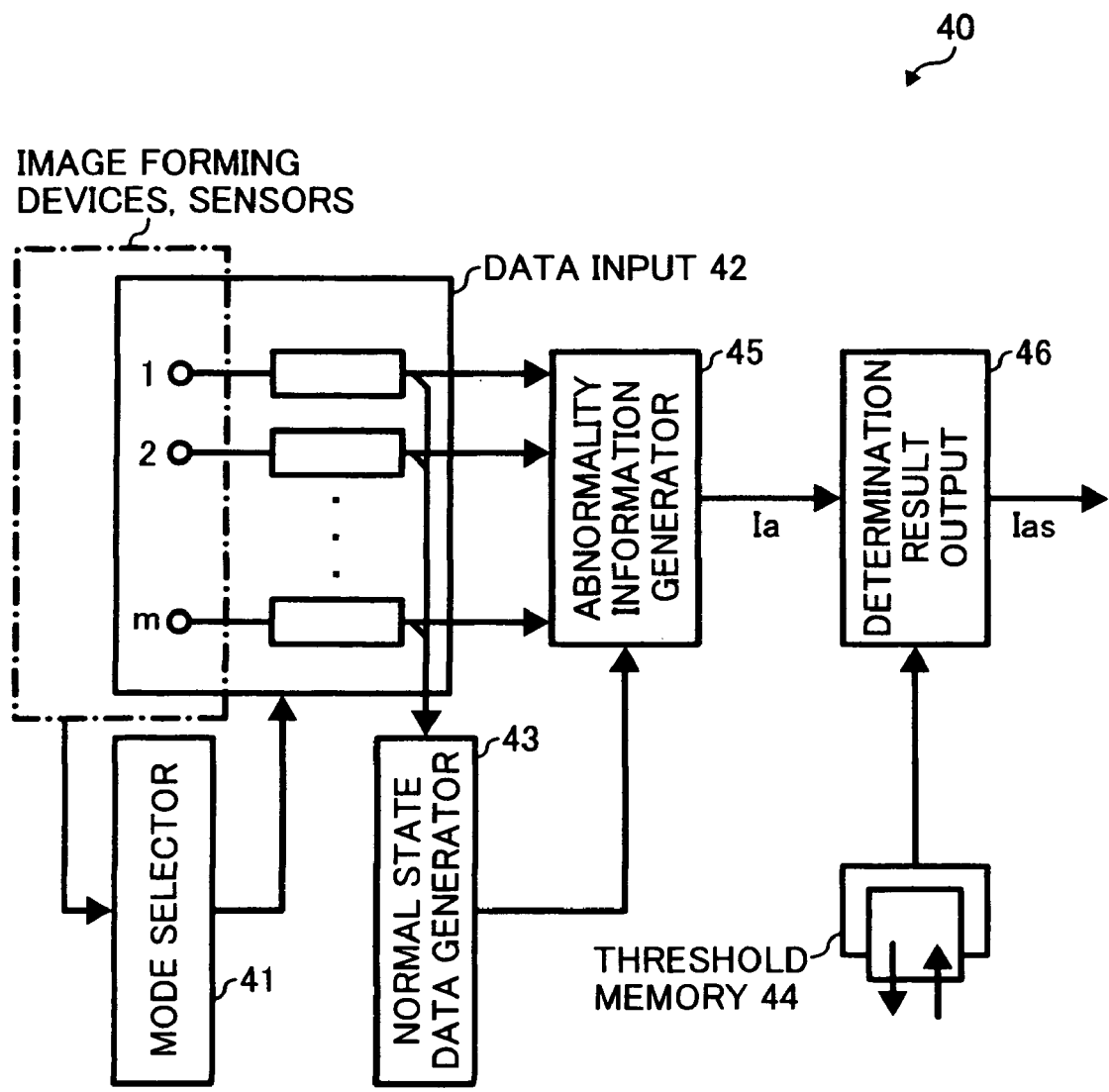
FIG. 12 illustrates an example structure of at least one of a first detector and a second detector shown in FIG. 3.

Referring to FIG. 12, the second detector 12 having the structure 40 obtains abnormality information of at least one device of the apparatus 100, which may be selected as a second selected device at S108 of FIG. 9B. In this example, the abnormality information is obtained using the Mahalanobis Taguchi System (MTS) method, as described below or in a substantially similar manner as described in any one of the US Patent Application Publication Nos. 2005/0281596 published on Dec. 22, 2005, 2005/0154562 published on Jul. 14, 2005, 2005/0286916 published on Dec. 29, 2005, and 2005/0002054 published on Jan. 6, 2005, the entire contents of each of which are hereby incorporated herein by reference. The structure 40 includes a mode selector 41, a data input 42, a normal state data generator 43, a threshold memory 44, an abnormality information generator 45, and a determination result output 46.

The mode selector 41 causes the second detector 12 to switch between a normal state mode and a current state mode. In this example, the second detector 12 obtains the abnormality information when the current state mode is selected.

When the current state mode is selected, the data input 42 obtains various kinds of information from the devices of the image forming apparatus 100, such as the image forming apparatuses and sensors 102 of FIG. 8, and outputs the obtained information to the abnormality information generator 45. Examples of information obtainable from the image forming apparatus 100 include, but are not limited to, sensing information, driving information, control parameter information, user history information, image characteristics information, etc.

The abnormality information generator 45 generates a plurality of sets of current state data using the information obtained from the image forming apparatus 100, and further generates abnormality information using the current state data and normal state data. The normal state data may be generated by the normal state data generator 42 before the time of inspection. Alternatively, the normal state data may be obtained from the external device or medium, and stored in the normal state data generator 42 before the time of inspection. In this example, each set of the plurality of sets of current state data may correspond to at least one device of the apparatus 100, which is selected as the second selected device. Alternatively, each set of the plurality of sets of current state data may correspond to at least one of the characteristics of the image forming apparatus 100, which will be inspected. Alternatively, each set of the plurality of sets of current state data may correspond to at least one of the abnormality types, which may be causing the apparatus 100 to operate abnormally and will be inspected.

For example, as illustrated in FIG. 13, if three abnormality types including the paper jam, photoconductor deterioration, and image density fluctuation are to be inspected, the abnormality information generator 45 generates three sets of current state data, each set corresponding to one of the above-described abnormality types. In this example, the paper jam abnormality type, the photoconductor deterioration abnormality type, and the image density fluctuation abnormality type respectively correspond to the sheet transfer characteristics, the photoconductor characteristics, and the developer characteristics of the image forming apparatus 100.

Still referring to FIG. 13, each set of current state data is generated using different kinds of information. The set of current state data used for detecting the paper jam, or the sheet transfer characteristics, is generated using information regarding the temperature, humidity, oscillation, colored area ratio of an image, toner amount, sheet incline, and sheet feed timing. The set of current state data used for detecting the photoconductor deterioration, or the photoconductor characteristics, is generated using the temperature, humidity, potential of the photoconductor 106 after charging, potential of the photoconductor 106 after development, colored area ratio of an image, photoconductor current amount, and photoconductor drive power. The set of current state data used for detecting the image density fluctuation, or the developer characteristics, is generated using the temperature, humidity, toner density, potential of the photoconductor 106 after charging, potential of the photoconductor 106 after development, colored area ratio of an image, and toner amount.

Further, in this example, the abnormality information generator 45 may generate a set of current state data, using all, or substantially all, kinds of information obtainable from the data input 42. This set of current state data for the general abnormality type may be used to determine whether the apparatus 100 is in the normal state or the abnormal state, while the above-described three sets of current state data are used to determine the abnormality type. Further, the set of current state data for the general abnormality type may be used to detect one or more abnormality types, which do not belong to the above-described three abnormality types.

Once the plurality of sets of current state data are generated, the abnormality information generator 45 generates the abnormality information, which indicates the difference between the normal state data and the current state data, for each of the plurality of sets. In this example, the abnormality information is expressed in terms of Mahalanobis Distance (MD).

As illustrated in FIG. 14, the abnormality information generator 45 obtains four MD values, a first MD ("$D0^2$"), a second MD ("$D1^2$"), a third MD ("$D2^2$"), and fourth MD ("$D3^2$"), which respectively correspond to the general abnormality type, paper jam abnormality type, photoconductor deterioration abnormality type, and image density fluctuation abnormality type. These four MD values are output as the abnormality information ("Ia" in FIG. 12) to the determination result output 46.

The determination result output 46 compares the abnormality information with an abnormality threshold value stored in the threshold memory 44 to generate a comparison result for each set of data. Based on the comparison results for all sets of data, the determination result output 46 determines whether the image forming apparatus 100 is in the abnormal state, or it may further determine the degree or type of abnormality based on the comparison if the apparatus 100 is determined to be in the abnormal state. In this example, the abnormality threshold value, which functions as the first abnormality threshold value or the second threshold value described referring to S110 of FIG. 9B, is previously set to 10 as illustrated in FIG. 14, for all sets of data. Alternatively, the abnormality threshold value may vary for each of the sets of data. Alternatively, the abnormality threshold value may be set according to the user preference. Alternatively, the abnormality threshold value may be selected from one or more abnormality threshold values, which may be stored in the threshold memory 44, for example, according to the type of the second selected device.

For example, referring to FIG. 14, if the comparison results indicate that the none of the first through fourth MDs is equal to or greater than 10, the determination result output 46 generates a second determination result indicating that the image forming apparatus 100 is in the normal state. If the comparison results indicate that the first MD $(D0)^2$ is less than 10 and at least one of the second to fourth MDs $(D1)^2$-$(D3)^2$ is equal to or greater than 10, the determination result output 46 generates a second determination result indicating that the image forming apparatus 100 is in the abnormal state, with the degree of abnormality being low. If the comparison results indicate that the first MD $(D0)^2$ is equal to or greater than 10, the determination result output 46 generates a second determination result indicating that the image forming apparatus 100 is in the abnormal state, with the degree of abnormality being higher than the above-described case of when the first MD is less than 10. In this manner, the state or the degree of abnormality of the image forming apparatus 100 may be determined.

Still referring to FIG. 14, if the comparison results indicate that the second MD $(D1)^2$ is equal to or greater than 10, the determination result output 46 generates a second determination result indicating that the image forming apparatus 100 is most likely to have the problem related to the paper jam. If the comparison results indicate that the third MD $(D2)^2$ is equal to or greater than 10, the determination result output 46 generates a second determination result indicating that the image forming apparatus 100 is most likely to have the problem related to the photoconductor deterioration. If the comparison results indicate that the fourth MD $(D3)^2$ is equal to or greater than 10, the determination result output 46 generates a second determination result indicating that the image forming apparatus 100 is most likely to have the problem related to the image density fluctuation. If the comparison results indicate that none of the second to fourth MDs $(D1)^2$-$(D3)^2$ is equal to or greater than 10 but the first MD $(D0)^2$ is equal to or greater than 10, the determination result output 46 generates a second determination result indicating that the image forming apparatus 100 is most likely to have the problem related to other types of abnormality. In this manner, the type of abnormality may be determined.

In this example, the second determination result, generated by the determination result output 46, may be further converted to notice information, which may be output as described above referring to S111 of FIG. 9B. FIG. 14 lists example messages to be displayed in a corresponding manner with the degree or type of abnormality being detected.

As described above referring to FIG. 12, the normal state data generator 43 may generate a plurality sets of normal state data, when the mode selector 41 selects the normal state mode.

For example, the mode selector 41 may select the normal state mode when the current operation time period of the apparatus 100 or any one of the devices of the apparatus 100 is less than a mode switching time period. The mode selector 41 may select the current state mode when the current operation time period of the apparatus 100 or any one of the devices of the apparatus 100 is equal to or greater than the mode switching time period. The mode switching time period may be previously determined relative to the reference time described above referring to FIG. 4 or 10. For example, to increase the accuracy in the normal state data, the value of the mode switching time period can be made smaller, since the image forming apparatus 100 or any one of the devices within the apparatus 100 is not likely to cause an error if the operation time period is smaller. The operation time period or the mode switching time period may be expressed in seconds, minutes, hours, dates, months, etc.

Alternatively, the mode selector 41 may select the normal state mode when the current operation amount of the apparatus 100 or any one of the devices of the apparatus 100 is less than a mode switching amount. The mode selector 41 may select the current state mode when the current operation amount of the apparatus 100 or any one of the devices of the apparatus 100 is equal to or greater than the mode switching amount. The mode switching amount may be previously determined relative to a reference amount, which is obtained when the device or the apparatus 100 is at the reference time. For example, to increase the accuracy in the normal state data, the value of the mode switching amount can be made smaller, since the image forming apparatus 100 or any one of the devices within the apparatus 100 is not likely to cause an error when the operation time period is smaller. The operation amount or the mode switching amount may be expressed in the number of printed sheets, the amount of toner being used, etc.

When the normal state mode is selected, the data input 42 obtains various kinds of information from the devices of the image forming apparatus 100, such as the image forming apparatuses and sensors 102 of FIG. 8, and outputs the obtained information to the normal state data generator 43. The normal state data generator 43 generates a plurality of sets of normal state data using the information obtained from the image forming apparatus 100, each set corresponding to at least one of the plurality of sets of current state data. The plurality of sets of normal state data are stored in the normal state data generator 42 to be used by the abnormality information generator 45 as described above. For example, as illustrated in FIG. 13 or 14, if four abnormality types including the general abnormality type, paper jam abnormality type, photoconductor deterioration abnormality type, and image density fluctuation abnormality type are to be inspected, the normal state data generator 42 generates four sets of normal state data, each set corresponding to one of these four sets of current state data. When the mode is switched from the normal state mode to the current state mode, the abnormality information generator 45 may use at least one of the plurality of sets of normal state data, to determine the state, degree, or type of abnormality.

Alternatively, the normal state data generator 42 may generate a set of normal state data for the general abnormality type, using all, or substantially all, kinds of information obtainable from the image forming apparatus 100. When the mode is switched from the normal state mode to the current state mode, the abnormality information generator 45 may use the set of normal state data for the general abnormality type to determine whether the apparatus 100 is in the abnormal state. The abnormality information generator 45 may further generate a set of normal state data for a specific abnormality type, from the set of normal state data for the general abnormality type stored in the normal state data generator 42, to determine the degree or type of abnormality.

In this example, the set of normal state data may be stored in various ways, for example as a set of various kinds of information ("raw data") obtained from the apparatus 100, a set of normalized raw data, a set of correlation matrix, a set of inverse matrix, or one or more tables.

The structure of the second detector 12 may be implemented in various other ways. In one example, instead of generating the normal state data using the normal state data generator 42, the second detector 12 may obtain the normal state data from the external device or medium. For example, the normal state data may be generated based on an image forming apparatus having a structure similar to the structure of the image forming apparatus 100, which operates in the normal state. In such a case, the mode selector 41 may not be provided. Further, the normal state data generator 43 or the threshold memory 44 may be implemented by any kind of storage, for example a removable medium such as a memory module, memory card, memory board, memory cartridge, ROM cartridge, IC card, floppy disk, etc.

As described above referring to FIGS. 9A and 9B, a combination of the first state and the second state is not limited to the example described above referring to FIGS. 10 to 14. Accordingly, the structure of the first detector 11 or the second detector 11 may vary depending on the combination of the first state and the second state. For example, when the first state corresponds to the current maintenance state, and the second state corresponds to the future maintenance state, the detector having the structure 30 of FIG. 10 may function as the first detector 11 and the second detector 12. In another example, when the first state corresponds to the abnormal state, and the second state corresponds to the maintenance state, the first detector 11 may have the structure 40 of FIG. 12 and the second detector 12 may have the structure 30 of FIG. 10. In another example, when the first state corresponds to the current abnormal state, and the second state corresponds to the future abnormal state, the detector having the structure 40 of FIG. 12 may function as the first detector 11 and the second detector 12, with the first memory 31, second memory 32, and timer 33 of FIG. 10 being additionally provided.

Referring now to FIGS. 15 to 20, example operations of detecting a state of the image forming apparatus 100 are explained. In this example, the functions of the state detecting system 10 described above referring to FIG. 3 are performed by a plurality of apparatuses, which are connected through a network as illustrated in FIG. 15.

Referring to FIG. 15, the state detecting system 10 includes a plurality of image forming apparatuses 100a, 100b, 100c, 100d, and 100e (collectively referred to as "the apparatus 100"), a communication device, a managing apparatus 200, and plurality of output devices 300a, 300b, 300c, 300d, and 300e (collectively referred to as "the output device 300").

The image forming apparatus 100 may have a structure substantially similar to the structure shown in FIG. 8. In this example, the image forming apparatus 100 is additionally provided with a network interface, which allows the apparatus 100 to send or receive data to or from the network. Further, the image forming apparatus 100 may operate or function differently according to a state detecting program, which may be stored in the controller 101.

The communication device may be implemented by any kind of communication device, which allows the apparatus 100 to communicate with other devices on the network, for example a modem, communication interface, etc. The managing apparatus 200 may be implemented by any kind of processor capable of detecting a state of the apparatus 100, for example a computer provided with a CPU and a memory. The output device 300 may be implemented by any kind of output device capable of outputting a result obtained by the managing apparatus 200, for example a display, a printer, or a speaker, which may be provided with a memory. The network may be implemented by, for example, the Internet or a communication line.

In this example, the function of detecting a first state of the apparatus 100 is performed by the apparatus 100. The function of detecting a second state of the apparatus 100 is performed by the managing apparatus 200. The function of outputting notice information may be performed by any one of the apparatus 100, managing apparatus 200, or the output device 300.

Referring now to FIGS. 19A and 19B, an example operation of detecting a first state of the image forming apparatus 100 is explained. In one example, the operation of FIGS. 19A and 19B may be performed by the controller 101 shown in FIG. 8. In this example, the controller 101 detects an abnormal state of the image forming apparatus 100 as the first state.

At S121, the controller 101 selects one or more devices to be detected ("the first selected device") from a plurality of devices in the image forming apparatus 100.

At S122, the controller 101 obtains abnormality information regarding the first selected device, and stores the abnormality information in the ROM 101b or the RAM 101c.

At S123, the controller 101 determines whether the first selected device is in the abnormal state, for example by comparing the abnormality information obtained at S122 with a first abnormality threshold value, to generate a first determination result. The first determination result may further indicate the degree or type of abnormality. The first abnormality threshold value may be stored in the ROM 101b. Alternatively, the first abnormality threshold value may be set by the user. Alternatively, the first abnormality threshold value may be set according to a signal received from the external apparatus, such as the managing apparatus 200, thorough the network. If the controller 101 determines that the first selected device is in the abnormal state ("YES" at S123), the operation proceeds to S124. Otherwise ("NO" at S123), the operation proceeds to S126.

At 124, the controller 101 sets the value of a flag to 1.

At S125, the controller 101 displays notice information regarding the first selected device that is determined to be in the abnormal state at S123, for example on the display of the operation panel 103 of FIG. 8. In this example, the notice information may be selected from various kinds of notice information, which may be stored in the ROM 101b, according to the first determination result. The notice information may include, for example, one or more messages listed in FIG. 14. As described above referring to FIG. 9A, the notice information may be output in various other ways. Further, the image forming apparatus 100 may be caused to perform image formation in a different mode.

At S126, the controller 101 determines whether all devices in the image forming apparatus 100 have been detected at S123. If all devices have been detected ("YES" at S126), the operation proceeds to S127 of FIG. 19A. Otherwise ("NO" at S126), the operation returns to S121 to select another device as a first selected device.

Referring to FIG. 19B, the controller 101 determines whether the value of flag is set to 1. If the flag value is set to 1 ("YES" at S127), the operation proceeds to S128. If the flag value is set to 0 ("NO" at S127), the operation ends.

At S128, the controller 101 sends an emergency signal to the managing apparatus 200 through the network. In this example, the emergency signal is used as notification, which notifies the managing apparatus 200 to perform further inspection on the apparatus 100. At this time, the controller

101 may send various kinds of information, including the first determination result indicating the state, degree, or type of abnormality of the abnormal state device, or usage information to be used by the managing apparatus 200. In this example, the usage information is obtained from all, or substantially all, of the devices of the image forming apparatus 100.

At S129, the controller 101 determines whether notice information, which is generated by the managing apparatus 200, is received from the managing apparatus 200. If the notice information is received ("YES" at S129), the operation proceeds to S130. Otherwise ("NO" at S129), the operation proceeds to S131.

At S130, the controller 101 outputs the notice information received from the managing apparatus 200. For example, the notice information may be displayed on the display of the operation panel 103 shown in FIG. 8.

At S131, the controller 101 sets the value of the flag to 0, and the operation ends.

Figure 16:
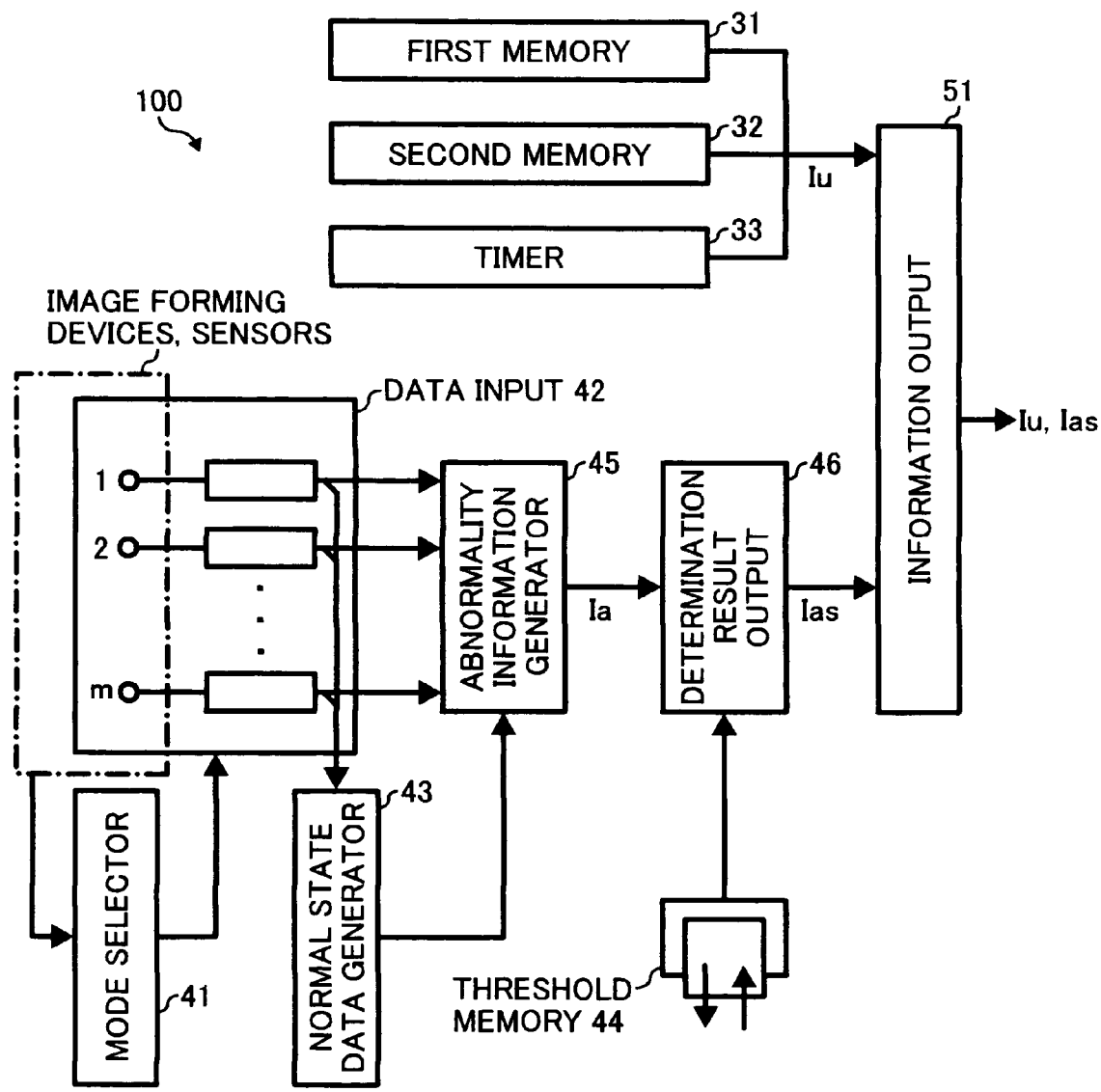
FIG. 16 illustrates an example structure of an apparatus shown in FIG. 15.

In another example, the operations of FIGS. 19A and 19B may be performed by the image forming apparatus 100 having a structure shown in FIG. 16. The structure of FIG. 16 is substantially similar to the structure shown in FIG. 12. The differences include the addition of a first memory 31, a second memory 32, a timer 33, and an information output 51.

As illustrated in FIG. 16, the abnormality information generator 45 generates the abnormality information Ia, and outputs it to the determination result output 46. Based on the abnormality information Ia, the determination result output 46 generates a first determination result indicating at least one of the state, degree, or type of abnormality. Additionally, the usage information Iu is generated for all, or substantially all, of the devices from information obtained by the first memory 31, second memory 32, and timer 33. The information output 51 sends the first determination result Ias and the usage information Iu, to the managing apparatus 200 shown in FIG. 15 through the network, together with the emergency signal.

The operation of FIGS. 19A and 19B may be performed in various other ways. For example, the usage information Iu or the first determination result Ias may be sent to the managing apparatus 200 at a predetermined timing, which may be set by default or according to the preference of the user or service provider. In such a case, the usage information Iu or the first determination result Ias may be sent at a timing different from the timing when the emergency signal is generated. In another example, the image forming apparatus 100 may detect a state other than the state described above.

Figure 20:
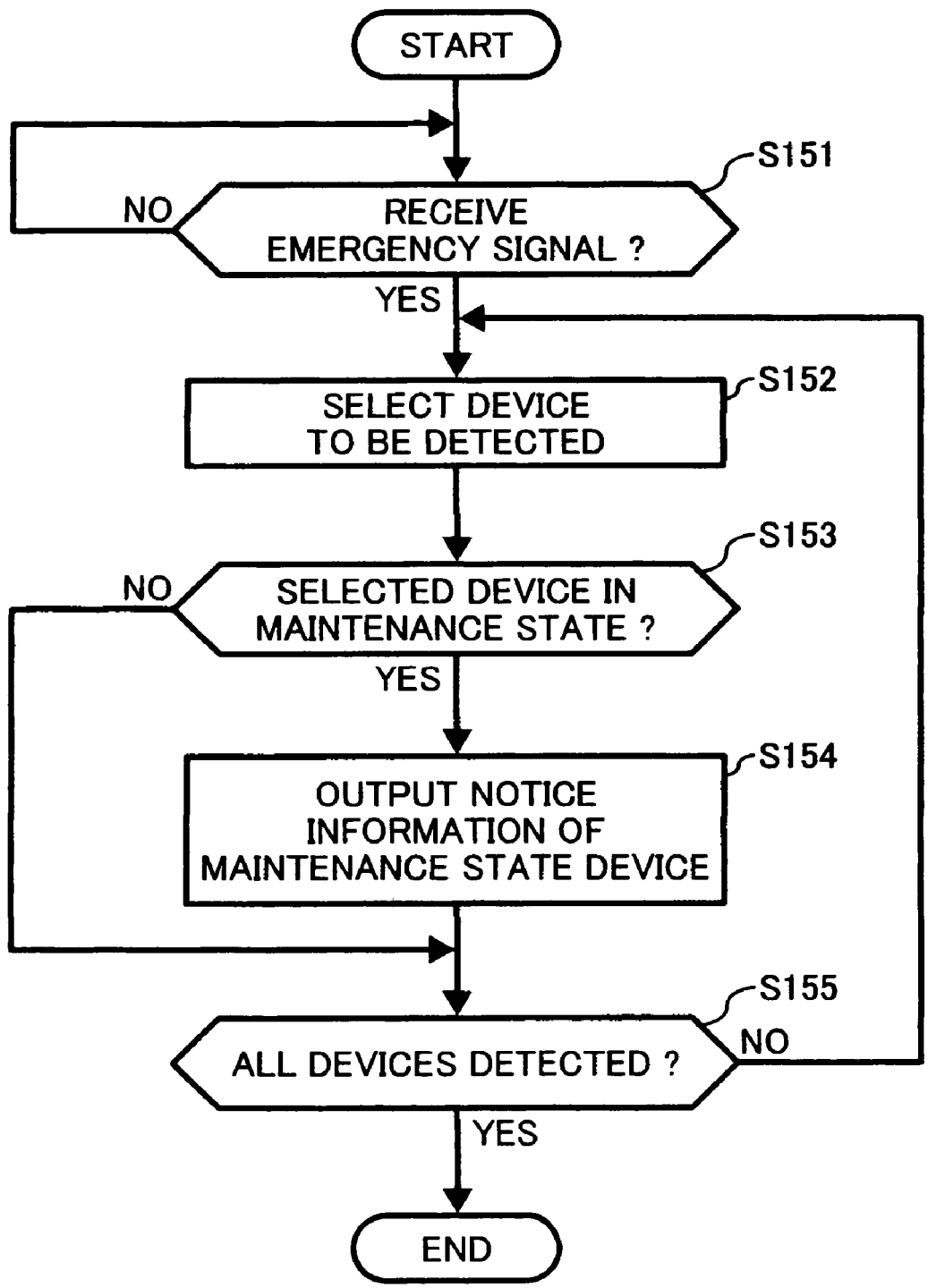
FIG. 20 illustrates an example operation of detecting a second state of an apparatus shown in FIG. 15, performed by the managing apparatus shown in FIG. 15.

Referring now to FIG. 20, an example operation of detecting a second state of the image forming apparatus 100 is explained. In one example, the operation of FIG. 20 may be performed by the managing apparatus 200. For example, when the CPU of the managing apparatus 200 is activated, the CPU may perform the operation of FIG. 20 according to the state detecting program, which may be stored in the memory. The state detecting program may be obtained from the external device or medium.

At S151, the managing apparatus 200 determines whether the emergency signal is received from the image forming apparatus 100, which is generated at S128 of FIG. 19B. If the emergency signal is received ("YES" at S151), the operation proceeds to S152. Otherwise ("NO" at S151), the operation repeats S151. At this time, the managing apparatus 200 may receive various kinds of information from the apparatus 100, which may be used for further inspection.

At S152, the managing apparatus 200 selects one or more devices to be detected ("the second selected device") from the first selected device of the image forming apparatus 100, which is not determined to be in the abnormal state at S123 of FIG. 19A.

At S153, the managing apparatus 200 determines whether the second selected device is in the maintenance state, for example by comparing the usage information obtained at S151 with a first usage threshold value, to generate a second determination result. The first usage threshold value may be stored in the memory of the managing apparatus 200. The first usage threshold value may be set by default, or it may be set according to the preference of the user or service provider.

At S154, the managing apparatus 200 outputs notice information regarding the second selected device, which is determined to be in the maintenance state at S153. In this example, the notice information may be selected from various kinds of notice information, which may be stored in the memory, depending on the second determination result. The managing apparatus 200 may send the notice information regarding the second selected device to the image forming apparatus 100 through the network for display. At the same time, the first determination result or the second determination result may be sent to the output device 300 shown in FIG. 15 through the network.

At S155, the managing apparatus 200 determines whether all devices, which are not determined to be in the abnormal state by the apparatus 100, have been detected at S153. If all devices have been detected ("YES" at S155), the operation ends. Otherwise ("NO" at S155), the operation returns to S152 to select another device as a second selected device.

Figure 17:
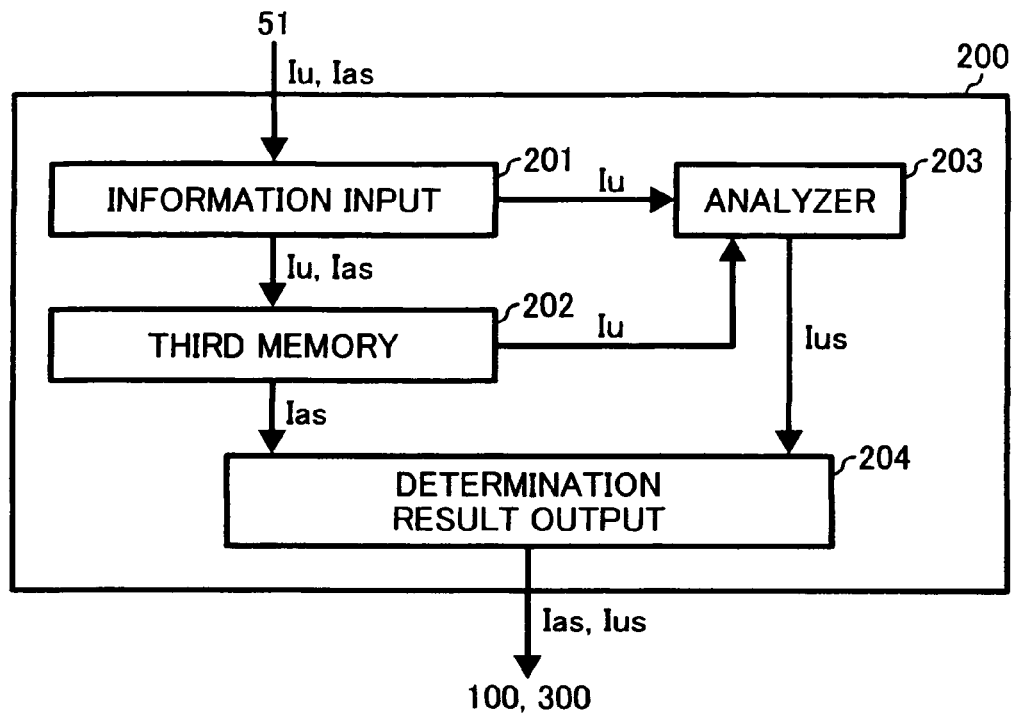
FIG. 17 illustrates an example structure of a managing apparatus shown in FIG. 15.

In another example, the operation of FIG. 20 may be performed by the managing apparatus 200 having a structure shown in FIG. 17. Referring to FIG. 17, the managing apparatus 200 includes an information input 201, a third memory 202, an analyzer 203, and a determination result output 204.

When the emergency signal is detected, the information input 201 inputs the first determination result Ias and the usage information Iu, which is received from the image forming apparatus 100. The first determination result Ias may be stored in the third memory 202, and sent to the determination result output 203. The usage information Iu may be stored in the third memory 202, and sent to the analyzer 203. Alternatively, the usage information Iu may be sent directly to the analyzer 203.

The analyzer 203 determines whether the second selected device is in the maintenance state, for example by comparing the usage information Iu obtained from the apparatus 100 with a first usage threshold value, to generate a second determination result Ius. In this example, the first usage threshold value may be stored in the third memory 202.

The determination result output 204 may send the first determination result Ias and the second determination result Ius to the output device 300 shown in FIG. 15. The determination result output 204 may further send the notification information regarding the second selected device to the image forming apparatus 100.

The operation of FIG. 20 may be performed in various other ways. For example, the managing apparatus 200 may receive the usage information Iu or the first determination result Ias from the image forming apparatus 100 at a predetermined timing, which may be set by default or according to the preference of the user or service provider. In such case, the usage information Iu or the first determination result Ia is stored in the third memory 202. Upon receiving the emergency signal, the analyzer 203 selects a second selected device, and reads out the information that corresponds to the second selected device from the third memory 202.

In another example, instead of detecting the second state of the second selected device using the same threshold value, the managing apparatus 200 may change the value of the first usage threshold value depending on the first state of the image forming apparatus 100. For example, when the emergency signal is not detected at S151 of FIG. 20, the managing apparatus 200 may determine whether the second selected device of the apparatus 100 is in the maintenance state, by comparing the usage information Iu with a second usage threshold value, which is different from the first usage threshold value used at S153. In this example, the second usage threshold value sets lower criteria when compared to the first usage threshold value. Accordingly, the managing apparatus 20 may detect the second state of the image forming apparatus 100 using a lower criteria when the emergency signal is not detected, while the managing apparatus 20 may detect the second state of the image forming apparatus 100 using a higher criteria when the emergency signal is detected.

Figure 18:
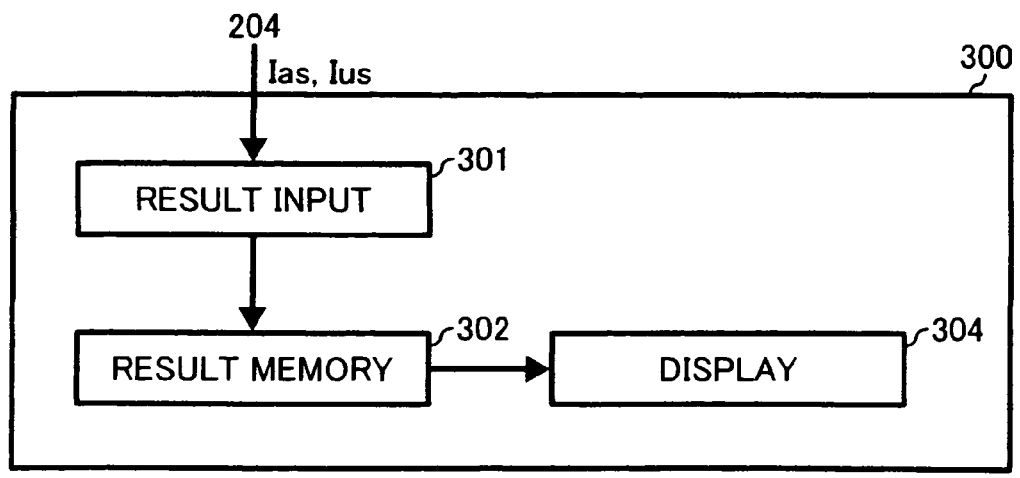
FIG. 18 illustrates an example structure of an output device shown in FIG. 15.

In this example, the output device 300 receives at least one of the first determination result Ias and the second determination result Ius, from the managing apparatus 200, and displays at least one of the first determination result Ias or the second determination result Ius to the user. Referring to FIG. 18, the output device 300 includes a result input 301, a result memory 302, and a display 304.

The result input 301 receives the first determination result Ias or the second determination result Ius from the managing apparatus 200, and stores the result Ias or Iu in the result memory 302. The notice information may be selected from various kinds of notice information stored in the result memory 302, depending on the first determination result Ias. Similarly, the notice information may be selected from various kinds of notice information stored in the result memory 302, depending on the second determination result Ius. The display 304 may display the notice information to the user.

Referring now to FIGS. 15, and 21 to 23, example operations of detecting a state of the image forming apparatus 100 are explained. In this example, the function of obtaining various kinds of information from the apparatus 100 is performed by the apparatus 100. The function of detecting a first state and a second state of the apparatus 100 is performed by the managing apparatus 200. The function of outputting notice information may be performed by any one of the apparatus 100, the managing apparatus 200, or the output device 300.

Figure 21:
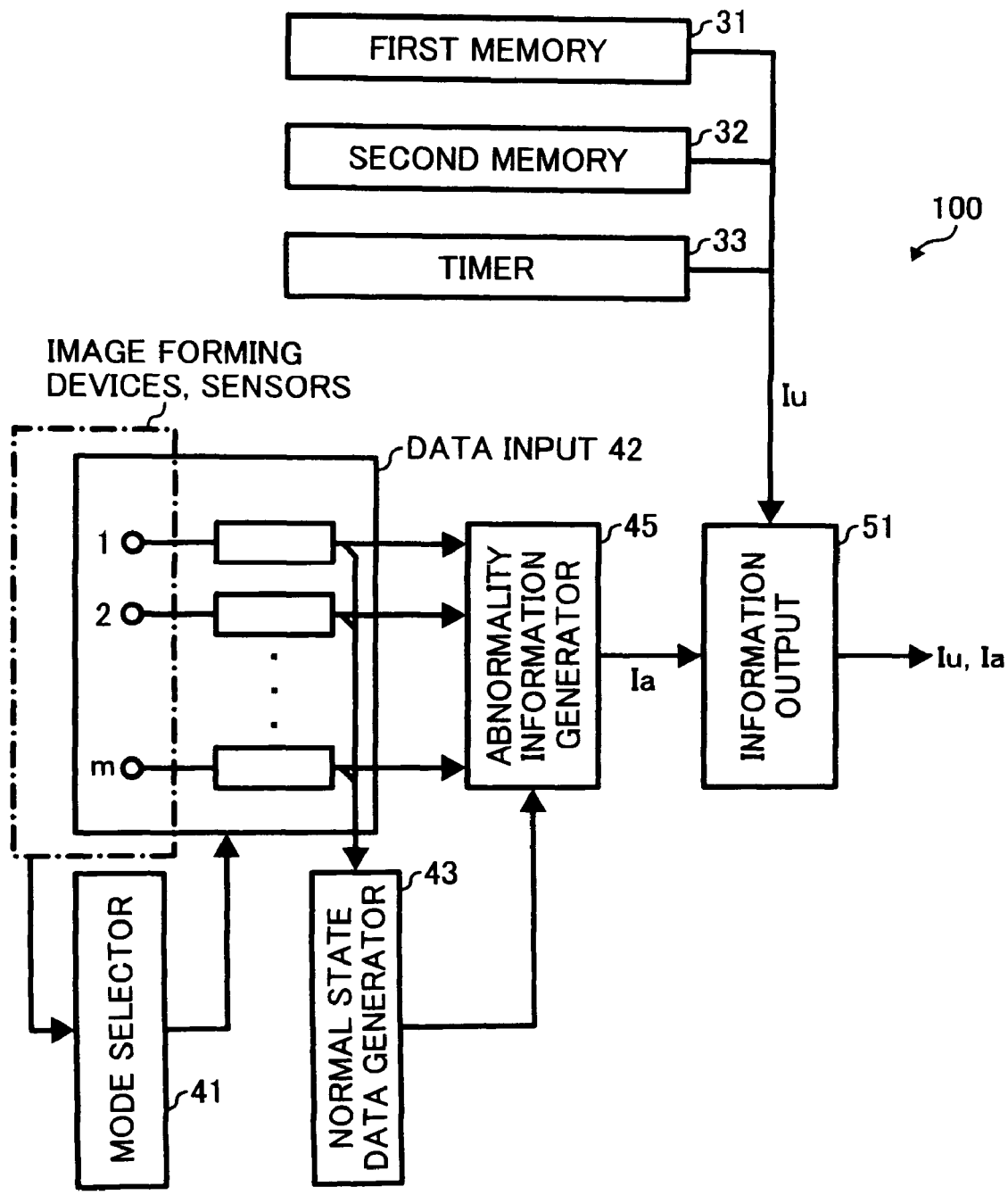
FIG. 21 illustrates an example structure of an apparatus shown in FIG. 15.

In this example, the image forming apparatus 100 may have a structure shown in FIG. 21. The structure of FIG. 21 is substantially similar to the structure shown in FIG. 16. The differences include the deletion of the determination result output 46 and the threshold memory 44.

The abnormality information generator 45 generates the abnormality information Ia for all, or substantially all, devices of the image forming apparatus 100, and outputs it to the information output 51. Additionally, the first memory 31, second memory 32, and timer 33 generate the usage information Iu for all, or substantially all, of the devices of the image forming apparatus 100, and output it to the information output 51. The information output 51 periodically outputs the abnormality information Ia and the usage information Iu to the managing apparatus 200.

Figure 22:
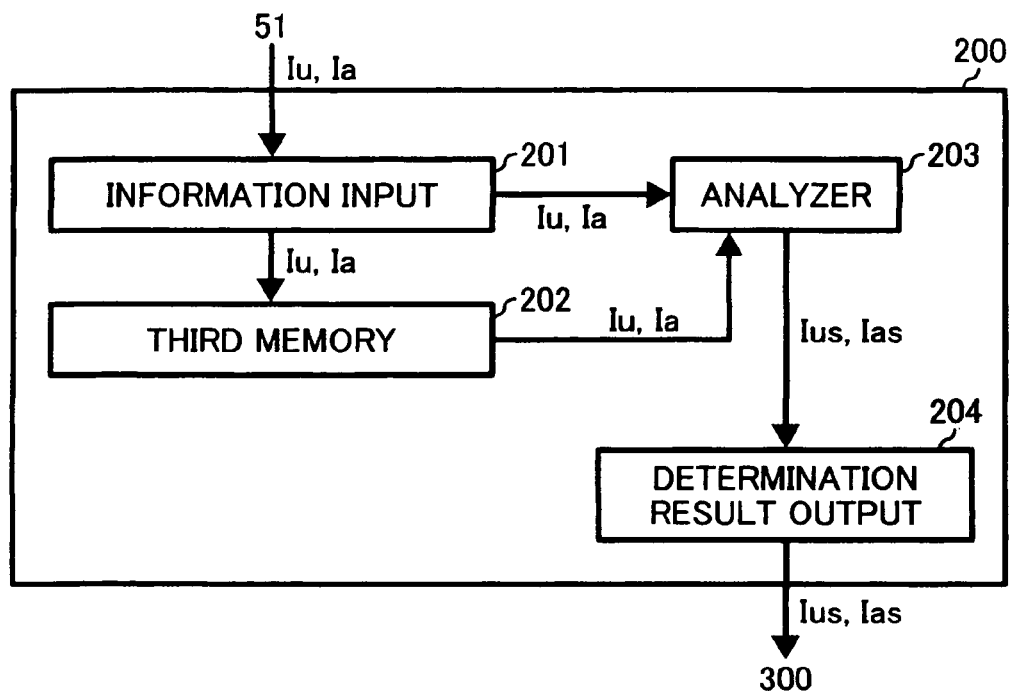
FIG. 22 illustrates an example structure of a managing apparatus shown in FIG. 15.

The managing apparatus 200 may have a structure shown in FIG. 22, which is substantially similar to the structure shown in FIG. 17. In this example, the analyzer 203 detects the first state and the second state of the image forming apparatus 100.

The information input 201 stores, in the third memory 202, the abnormality information Ia and the usage information Iu, which is received from the image forming apparatus 100. The analyzer 203 determines whether any one of the devices of the apparatus 100 is in the maintenance state, by comparing the usage information Iu with a first usage threshold value, to generate a first determination result Ius. When the first determination result indicates that at least one of the devices is in the maintenance state, the analyzer 203 may determine whether any one of the devices of the apparatus 100 is in the abnormal state, by comparing the abnormality information Ia with a first abnormality threshold value, to generate a second determination result Ias. In this example, the first usage threshold value or the first abnormality threshold value may be stored in the third memory 202. The first determination result Ius and the second determination result Ias may be output to the output device 300 through the determination result output 204.

Figure 23:
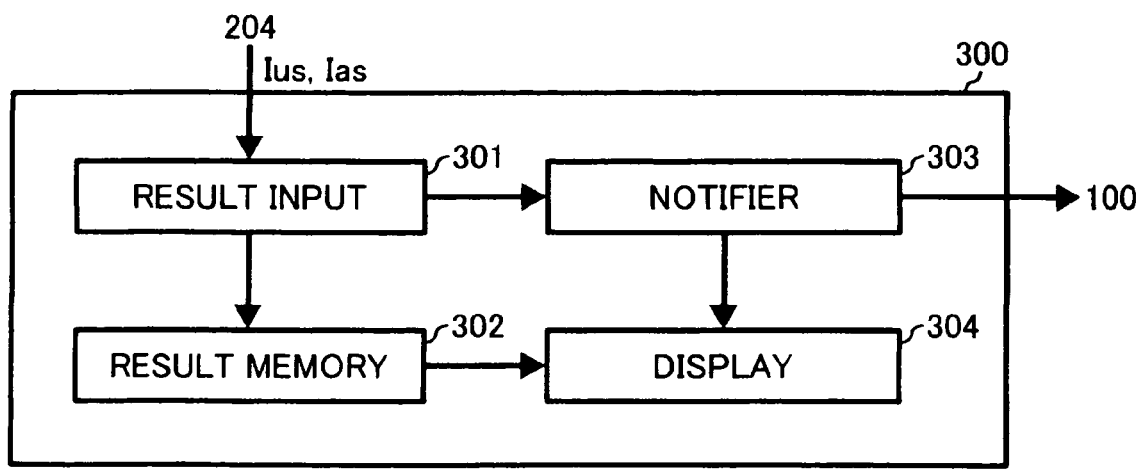
FIG. 23 illustrates an example structure of an output device shown in FIG. 15.

The output device 300 may have a structure shown in FIG. 23, which is substantially similar to the structure shown in FIG. 18. The differences include the addition of a notifier 303.

The result input 301 may store, in the result memory 302, the first determination result Ius and the second determination result Ias, which is received from the managing apparatus 200. Alternatively, the result input 301 may send the first determination result Ius and the second determination result Ias to the notifier 303.

The notifier 303 may send the first determination result Ius or the second determination result Ias to the image forming apparatus 100 or the display 304.

The result memory 302 may store various kinds of notice information, which correspond to at least one kind of data contained in the first determination result Ius or the second determination result Ias.

Upon receiving the first determination result Ius or the second determination result Ias, the display 304 may display the notice information, which corresponds to the first determination result Ius or the second determination result Ias, to the user. Alternatively, any one of the first determination result Ius, second determination result Ias, and notice information may be read out, in a corresponding manner, and displayed to the user in the form of a table.

Figure 24:
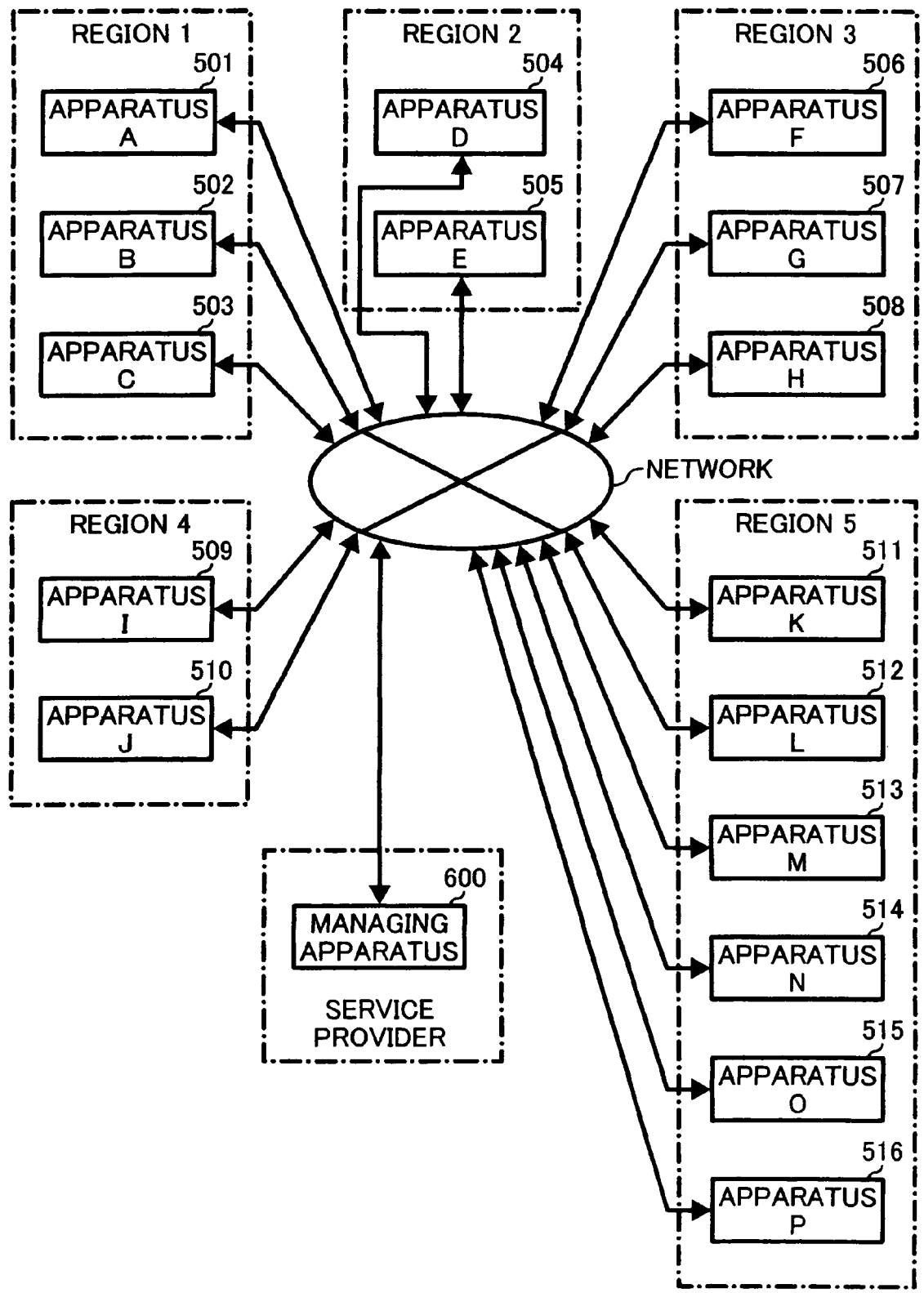
FIG. 24 illustrates a state detecting system according to an example embodiment of the present invention.
Figure 25A:
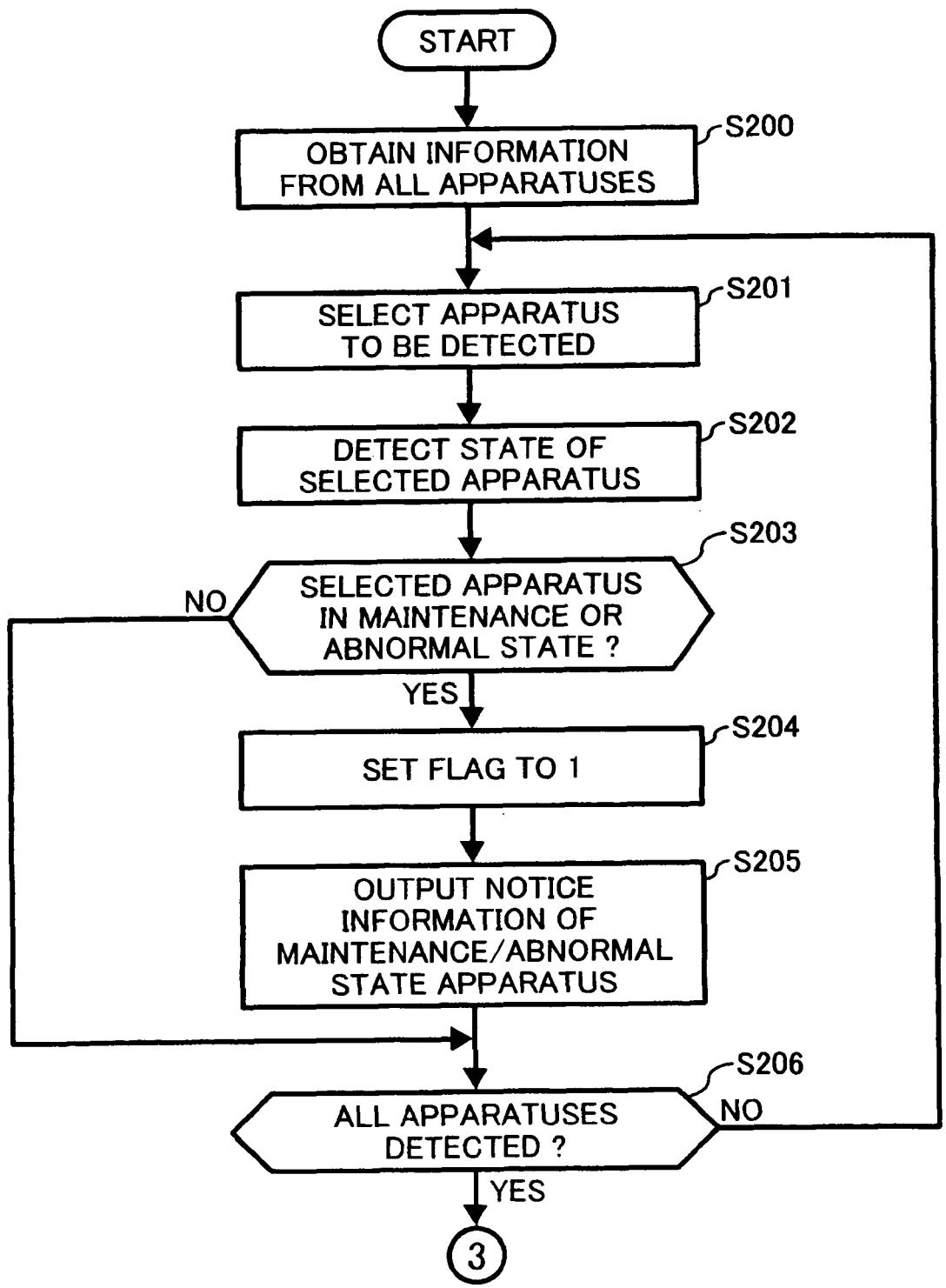
FIGS. 25A and 25B illustrate an example operation of detecting states of more than one apparatus shown in FIG. 24.
Figure 25B:
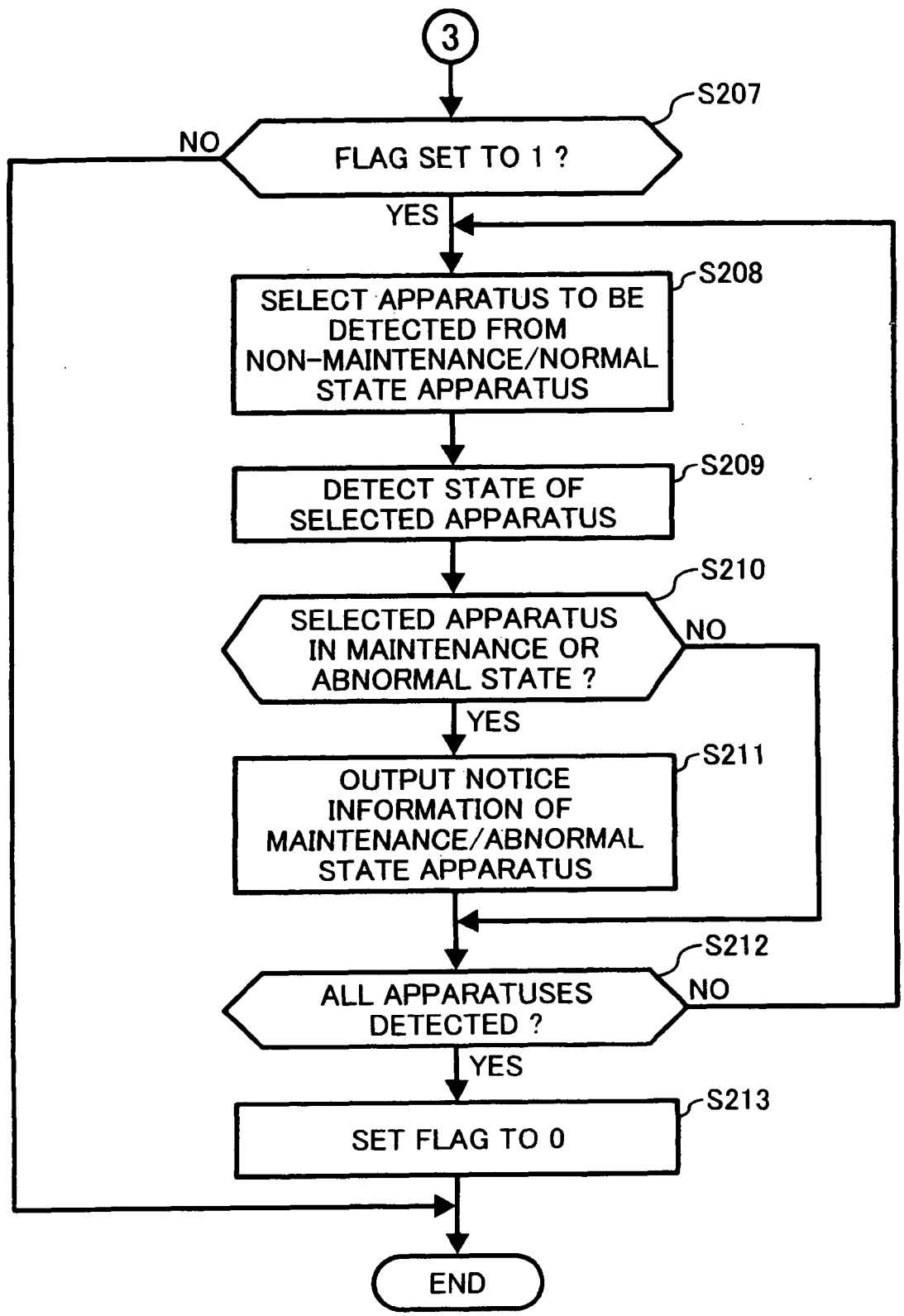

Referring now to FIG. 24, FIGS. 25A and 25B, example operations of detecting states of more than one apparatus is explained.

The state detecting system shown in FIG. 24 includes a plurality of apparatuses A 501 to P 516, each of which is connected to a managing apparatus 600 through the network. Any one of the apparatuses A 501 to P 516 may be implemented in various ways, as long as the apparatus is capable of communicating with the managing apparatus 600. For the descriptive purposes, each of the apparatuses A 501 to P 516 is assumed to be implemented as an image forming apparatus, such as a copier, a facsimile, a scanner, or a multifunctional apparatus capable of performing the function of copying, faxing, and scanning.

Still referring to FIG. 24, the apparatus A 501, apparatus B 502, and apparatus C 503 are located in the region 1. The apparatus D 504 and the apparatus E 505 are located in the region 2. The apparatus F 506, apparatus G 507, and apparatus H 508 are located in the region 3. The apparatus I 509 and apparatus J 510 are located in the region 4. The apparatus K 511, apparatus L 512, apparatus M 513, apparatus N 514, apparatus O 515, and apparatus P 516 are located in the region 5. The managing apparatus 600 is located at a service provider, which provides various services to regions 1 to 5, either remotely or on-site.

In operation, each of the apparatuses A 501 to P 516 (collectively, referred to as "the apparatus 500") obtains various kinds of information, and stores the information in its memory at a predetermined timing. For example, the predetermined timing may be a timing when the apparatus 500 performs image formation. The various kinds of information, which are stored in the memory, are sent to the managing apparatus 600 through the network every predetermined time interval, for example every 2 hours. At this time, the apparatus 500 sends its identification information, such as the ID number, to the managing apparatus 600, together with the various kinds of information.

In this example, the apparatus 500 may periodically monitor whether any one of the devices operates normally. For example, the apparatus 500 may monitor sensing information, and detect an error state of at least one of the devices by comparing the detected sensing information with reference sensing information. The reference sensing information corresponds to sensing information obtained from the device or the apparatus operating normally. Such information may include, for example, a current amount supplied to a heater, surface temperature of a belt, potential of a photoconductor, rotation of a gear, response signal generated by a circuit, etc. When the error state is detected for at least one of the devices, the apparatus 500 sends an emergency signal to the managing apparatus 600 through the network.

The managing apparatus 600 stores various kinds of information from the apparatus 500 in its memory, in a corresponding manner with the identification information and the regional information, in the form of a table. The regional information identifies the region to which each apparatus 500 belongs.

The managing apparatus 600 determines whether the emergency signal is received from any one of the apparatuses A 501 to P 516.

When the emergency signal is not detected, the managing apparatus 600 may determine whether any one of the apparatuses A 501 to P 516 is in a maintenance state or an abnormal state, by comparing usage information or abnormality information with a first threshold value. This operation may be performed every predetermined time interval, for example every 2 hours.

When the emergency signal is detected, the managing apparatus 600 may identify which of the apparatuses A 501 to P 516 has sent the emergency signal. Once the apparatus 500 that has sent the signal is identified, the managing apparatus 600 further searches for one or more apparatuses 500, which are located in the region to which the identified apparatus 500 belongs. The managing apparatus 600 may determine whether any one of the identified and searched apparatuses 500, which are located in the region, is in a maintenance state or an abnormal state, by comparing usage information or abnormality information with a second threshold value. In this example, the second threshold value sets higher criteria than the criteria set by the first threshold value.

Referring now to FIGS. 25A and 25B, an example operation of detecting states of one or more apparatuses is explained.

Referring to FIG. 25A, at S200, the managing apparatus 600 obtains various kinds of information from each of the apparatuses A 501 to P 516. For example, the managing apparatus 600 may obtain the information every predetermined time interval.

At S201, the managing apparatus 600 selects at least one of the apparatuses A 501 to P 516, which will be inspected, as a selected apparatus 500. The selection may be made by default, for example, according to statistical data obtainable from each of the apparatuses A 501 to P 516. The selection may be made according to the preference of the user or service provider.

At S202, the managing apparatus 600 detects a first state of the selected apparatus 500. In one example, the managing apparatus 600 detects a maintenance state of the selected apparatus 500 by obtaining usage information of the selected apparatus 500. In another example, the managing apparatus 600 detects an abnormal state of the selected apparatus 500 by obtaining abnormality information of the selected apparatus 500.

At S203, the managing apparatus 600 determines whether the selected apparatus 500 is in the first (maintenance or abnormal) state. In one example, the managing apparatus 600 determines whether the selected apparatus 500 is in the maintenance state, by comparing the usage information obtained at S202 with a first usage threshold value. In another example, the managing apparatus 600 determines whether the selected apparatus 500 is in the abnormal state, by comparing the abnormality information obtained at S202 with a first abnormality threshold value. In this example, the first usage threshold value or the first abnormality threshold value may be stored in the memory of the managing apparatus 600. If the managing apparatus 600 determines that the selected apparatus 500 is in the first state ("YES" at S203), the operation proceeds to S204. Otherwise ("NO" at S203), the operation proceeds to S206.

At S204, the managing apparatus 600 sets the value of a flag to 1.

At S205, the managing apparatus 600 outputs notice information regarding the selected apparatus 500, which is determined to be in the first state at S203.

At S206, the managing apparatus 600 determines whether all apparatuses A 501 to P 516 on the network have been detected. If all apparatuses A 501 to P 516 have been detected ("YES" at S206), the operation proceeds to S207 of FIG. 25B. Otherwise ("NO" at S206), the operation returns to S201.

Referring to FIG. 25B, at S207, the managing apparatus 600 determines whether the value of flag is set to 1. If the flag value is set to 1 ("YES" at S207), the operation proceeds to S208. Otherwise ("NO" at S207), the operation ends.

At S208, the managing apparatus 600 selects one of the apparatuses A 501 to P 516, which belongs to the same region as the first selected device that is determined to be in the first state at S203, as a second selected apparatus 500.

At S209, the managing apparatus 600 detects a second state of the second selected apparatus 500. In one example, the managing apparatus 600 detects a maintenance state of the second selected apparatus 500, by obtaining usage information of the second selected apparatus 500 when the abnormal state is detected at S202. In another example, the managing apparatus 600 detects an abnormal state of the second selected apparatus 500 by obtaining abnormality information of the second selected apparatus 500 when the maintenance state is detected at S202. In another example, the managing apparatus 600 detects a future maintenance state of the second selected apparatus 500 by obtaining future usage information of the second selected apparatus 500 when the maintenance state is detected at S202. In another example, the managing apparatus 600 detects a future abnormal state of the second selected apparatus 500 by obtaining future abnormality information of the second selected apparatus 500 when the abnormal state is detected at S202.

At S210, the managing apparatus 600 determines whether the second selected apparatus 500 is in the second state. If the second selected apparatus 500 is determined to be in the second state ("YES" at S210), the operation proceeds to S211. Otherwise ("NO" at S210), the operation proceeds to S212.

At S211, the managing apparatus 600 outputs notice information regarding the second selected apparatus 500, which is determined to be in the second state at S210.

At S212, the managing apparatus 600 determines whether all apparatuses A 501 to P 516, which belong to the same region as the first selected device that is determined to be in the first state at S203, have been detected. If all apparatuses belonging to the same region have been detected ("YES" at S212), the operation proceeds to S213. Otherwise ("NO" at S212), the operation returns to S208 to select another apparatus as a second selected apparatus.

At S213, the managing apparatus 600 sets the flag value to 0, and the operation ends.

Any one of the apparatuses shown in FIG. 24 may be performed in various other ways.

For example, at least one of the apparatuses 500 in the region may perform the function of detecting a first state of each of the apparatuses 500 located in the same region. In the case of Region 1, the apparatus A 501 may perform the function of detecting a first state of each of the apparatuses A 501, B 502, and C 503.

In operation, the apparatus A 501 obtains various kinds of information from each of the apparatuses A 501, B 502, and C 503, and determines whether any one of the apparatuses A 501, B 502, and C 503 is in a first state, to generate a first determination result. If any one of the apparatuses A 501, B 502, and C 503 is determined to be in the first state, the apparatus A 501 sends an emergency signal to the managing apparatus 600 through the network. In this case, the determination result may not be sent to the managing apparatus 600.

Once the energy signal is received, the managing apparatus 600 sends a request signal, which requests the apparatus A 501 to detect a second state of each one of the apparatuses A 501, B 502, and C 503, using a criteria higher than the criteria used for the first state detection.

Upon receiving the request signal from the managing apparatus 600, the apparatus A 501 determines whether any one of the apparatuses A 501, B 502, and C 503 is in a second state, to generate a second determination result.

Numerous additional modifications and variations are possible in light of the above teachings. It is therefore to be understood that within the scope of the appended claims, the disclosure of this patent specification may be practiced in ways other than those specifically described herein.

Further, as described above, any one of the above-described and other methods of the present invention may be embodied in the form of a computer program stored in any kind of storage medium. Examples of storage mediums include, but are not limited to, a flexible disk, a hard disk, an optical discs, magneto-optical discs, magnetic tapes, involatile memory cards, a memory cartridge, a ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

This patent application is based on and claims priority to Japanese patent application Nos. 2005-173460 filed on Jun. 14, 2005, and 2005-230748 filed on Aug. 9, 2005, in the Japanese Patent Office, the entire contents of each of which are hereby incorporated herein by reference.

The invention claimed is:

1. A method for detecting a state of a system including a plurality of apparatuses, performed by a state detecting system including a first detector and a second detector, the method comprising:

first obtaining, using the first detector, first information of a first selected apparatus and a second selected apparatus, the first selected apparatus and the second selected apparatus being at least two of the plurality of apparatuses of the system, the first information indicating a current state of the first selected apparatus and the second selected apparatus;

first determining, using the first detector, whether the first selected apparatus is in an abnormal or maintenance state and whether the second selected apparatus is in the abnormal or maintenance state, based on the first information by comparing the first information with a first threshold value to generate a first determination result;

second obtaining, using the second detector and only when the first determination result indicates that the first selected apparatus is in the abnormal or maintenance state and the second selected apparatus is not in the abnormal or maintenance state, second information of only the second selected apparatus as at least one of the plurality of apparatuses which is not determined to be in the abnormal or maintenance state in the first determining, the second information used for predicting whether the second selected apparatus will be in the abnormal or maintenance state within a predetermined period of time; and second determining, using the second detector, whether the second selected apparatus is in a second state based on the second information, and to generate a second determination result when the first selected apparatus is determined to be in the abnormal or maintenance state and the second information of the second selected apparatus indicates the second selected apparatus is predicted to be in the abnormal or maintenance state within the predetermined period of time.

2. The method of claim 1, further comprising:

outputting notice information, from the first detector to the second detector when the first determination result indicates that at least one of the plurality of apparatuses is in the abnormal or maintenance state, wherein:

the second obtaining is performed by the second detector when the notification information is obtained from the first detector.

3. The method of claim 1, wherein:

the second determining comprises comparing the second information with a second threshold value, which is set to a higher criteria than the first threshold value, to generate the second determination result indicating whether the selected second apparatus is predicted to be in the abnormal or maintenance state within the predetermined period of time.

4. The method of claim 1, wherein the second information is estimated based on statistical data obtained from the first information, and wherein the second determining comprises:

comparing the second information with the first threshold value to generate the second determination result indicating whether the selected second apparatus is predicted to be in the abnormal or maintenance state within the predetermined period of time.

5. The method of claim 1, wherein the first information corresponds to first abnormality information indicating the difference between current state data and first normal state data, and wherein the second information corresponds to second abnormality information indicating the difference between the current state data and second normal state data, with the second normal state data being set to a higher criteria than the first normal state data.

6. The method of claim 1, wherein:
the first information is at least one of:
usage information to be used for determining whether the current state of the first selected apparatus is in a maintenance state; and
abnormality information to be used for determining whether the current state of the first selected apparatus is in an abnormal state, and wherein:
the second information is at least one of:
abnormality information to be used for determining whether the current state of the second selected apparatus is in a maintenance state when the first information is the usage information; and
usage information to be used for determining whether the current state of the second selected apparatus is in an abnormal state when the first information is the abnormal information.

7. A system for detecting a state of a plurality of apparatuses, comprising:
a first detector configured to obtain first information indicating a current state of a first selected apparatus and a second selected apparatus, the first selected apparatus and the second selected apparatus being at least two of the plurality of apparatuses, and to determine whether the first selected apparatus is in an abnormal or maintenance state and whether the second selected apparatus is in the abnormal or maintenance state, by comparing the first information with a first threshold value to generate a first determination result; and
a second detector connected to the first detector via a network and configured to obtain second information indicating for only the second selected apparatus as at least one of the plurality of apparatuses that is not determined to be in the abnormal or maintenance state, the second information predicting whether the second selected apparatus will be in the abnormal or maintenance state within a predetermined period of time, and only when the first determination result indicates that the first selected apparatus is in the abnormal or maintenance state and the second selected apparatus is not in the abnormal or maintenance state, and to determine whether the second selected apparatus is in a second state based on the second information, and to generate a second determination result when the first selected apparatus is determined to be in the abnormal or maintenance state and the second information of the second selected apparatus indicates the second selected apparatus is predicted to be in the abnormal or maintenance state within the predetermined period of time.

8. The system of claim 7, wherein the second detector is further configured to compare the second information with a second threshold value, which is set to a higher criteria than the first threshold value, to generate the second determination result indicating whether the selected second apparatus is predicted to be in the abnormal or maintenance state within the predetermined period of time.

9. The system of claim 8, wherein the first detector is further configured to send notification to the second detector via the network when the first determination result indicates that the at least one of the plurality of apparatuses is in the abnormal or maintenance state, and the second detector is further configured to change the second threshold value to have criteria higher than criteria of the first threshold value.

10. The system of claim 7, wherein the second information for predicting whether the second selected apparatus will be in the abnormal or maintenance state within the predetermined time is estimated based on statistical data obtained from the first information, and the second information is compared with the first threshold value to generate the second determination result indicating whether the selected second apparatus is predicted to be in the abnormal or maintenance state within the predetermined period of time.

11. The system of claim 7, wherein the first information is first abnormality information indicating the difference between current state data and first normal state data, the second apparatus is further configured to obtain, as the second information, second abnormality information indicating the difference between the current state data and second normal state data, with the second normal state data being set to a higher criteria than the first normal state data.

12. A non-transitory computer readable medium storing computer instructions for causing a computer to perform a method of detecting a state of a system including a plurality of apparatuses, the method comprising:
first obtaining first information of a first selected apparatus and a second selected apparatus, the first selected apparatus and the second selected apparatus being at least two of the plurality of apparatuses, the first information indicating a current state of the first selected apparatus and of the second selected apparatus;
first determining whether the first selected apparatus is in an abnormal or maintenance state and whether the second selected apparatus is in the abnormal or maintenance state, based on the first information by comparing the first information with a first threshold value to generate a first determination result;
second obtaining second information of only the second selected apparatus as at least one of the plurality of apparatuses which is not determined to be in the abnormal or maintenance state in the first determining, and only when the first determination result indicates that the first selected apparatus is in the abnormal or maintenance state and the second selected apparatus is not in the abnormal or maintenance state, the second information is used for predicting whether the second selected apparatus will be in the abnormal or maintenance state within a predetermined period of time; and
second determining whether the second selected apparatus is in a second state based on the second information, and to generate a second determination result when the first selected apparatus is determined to be in the abnormal or maintenance state and the second information of the second selected apparatus indicates the second selected apparatus is predicted to be in the abnormal or maintenance state within the predetermined period of time.

* * * * *